(12) United States Patent
Chung et al.

(10) Patent No.: US 9,116,394 B2
(45) Date of Patent: Aug. 25, 2015

(54) DISPLAY PANEL

(71) Applicant: Au Optronics Corporation, Hsinchu (TW)

(72) Inventors: Jen-Yang Chung, Penghu County (TW); Kun-Cheng Tien, New Taipei (TW); Ming-Huei Wu, Yilan County (TW); Shin-Mei Gong, Taoyuan County (TW); Chien-Huang Liao, Hsinchu (TW); Wen-Hao Hsu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 331 days.

(21) Appl. No.: 13/654,434

(22) Filed: Oct. 18, 2012

(65) Prior Publication Data

US 2013/0293822 A1 Nov. 7, 2013

(30) Foreign Application Priority Data

May 7, 2012 (TW) .............................. 101116205 A

(51) Int. Cl.
*G02F 1/1337* (2006.01)
*G02F 1/1343* (2006.01)
*G02F 1/139* (2006.01)

(52) U.S. Cl.
CPC .... *G02F 1/133707* (2013.01); *G02F 1/134309* (2013.01); *G02F 1/1393* (2013.01); *G02F 2001/133757* (2013.01); *G02F 2001/134345* (2013.01)

(58) Field of Classification Search
CPC .................................................. G02F 1/133707
USPC .................................................. 349/129, 144
See application file for complete search history.

(56) References Cited

U.S. PATENT DOCUMENTS

| | | | |
|---|---|---|---|
| 6,424,398 B1 | 7/2002 | Taniguchi | |
| 7,612,852 B2 | 11/2009 | Chi et al. | |
| 2010/0253897 A1* | 10/2010 | Ohgami et al. | 349/142 |
| 2011/0242468 A1* | 10/2011 | Choi et al. | 349/129 |
| 2013/0050629 A1* | 2/2013 | Kang | 349/144 |

\* cited by examiner

*Primary Examiner* — Michael Caley
*Assistant Examiner* — Edmond Lau
(74) *Attorney, Agent, or Firm* — Jianq Chyun IP Office

(57) ABSTRACT

A display panel includes a pair of substrates, a pixel structure, and a display medium layer disposed between the pair of substrates. The pixel structure is disposed on one of the substrates, and includes first and second sub-pixels. The first sub-pixel includes a first pixel electrode, wherein the first pixel electrode has a first spacing in a first main region and has a second spacing in a first minor region, wherein the second spacing is smaller than the first spacing. The second sub-pixel includes a second pixel electrode, wherein the second pixel electrode has a third spacing in a second main region and has a fourth spacing in a second minor region, wherein the fourth spacing is larger than or equal to the third spacing, and wherein the first spacing is larger than the third spacing.

23 Claims, 12 Drawing Sheets

DISPLAY PANEL

CROSS-REFERENCE TO RELATED APPLICATION

This application claims the priority benefit of Taiwan application serial no. 101116205, filed on May 7, 2012. The entirety of the above-mentioned patent application is hereby incorporated by reference herein and made a part of this specification.

TECHNICAL FIELD

The invention relates to a panel, more particularly to a display panel.

BACKGROUND

As the LCD technology continuously progresses in a direction of providing a bigger display screen, the wide viewing techniques are being developed to improve the limited viewing angle inherent in a large-size display device. At the current stage, a commonly used wide viewing angle technique is a multi-domain vertical alignment (MVA) LCD panel.

In a LCD panel, an alignment pattern is designed to divide the liquid crystal molecules of a same pixel region into a plurality of different alignment domains to achieve a wide viewing angle display effect, i.e. the MVA LCD panel. Limited by optical characteristics of the liquid crystal molecules, this type of LCD panel may have, under different viewing angles, a color shift or an inadequate color saturation phenomenon, which is generally referred as a color washout phenomenon. Particularly, the color shift or inadequate color saturation phenomenon is more severe in a display image of a middle-low gray level. In order to mitigate such phenomenon, based on amelioration of a driving technique and a pixel design, a technique of forming display regions with different brightness in a single pixel region and forming a plurality of alignment regions in each of the display regions with different brightness is provided.

Although the aforementioned methods for resolving the color shift or inadequate color saturation phenomenon can mitigate a problem of whitish in the case of a large viewing angle (side view), a side view image, comparing with the front view image, still has the problem of bluish, greenish or reddish. Hence, the image viewed by a viewer is unnatural.

SUMMARY

An exemplary embodiment of the invention provides a display panel, in which the color shift problem of a side view image, comparing with a front view image, is mitigated.

An exemplary embodiment of the invention provides a display panel, which includes a first substrate, a pixel structure, a second substrate and a display medium layer. The pixel structure is disposed on the first substrate, and the pixel structure includes a first sub-pixel and a second sub-pixel. The first sub-pixel includes a first pixel electrode, wherein the first pixel electrode has a first spacing in a first main region and has a second spacing in a first minor region, and wherein the first spacing is greater than the second spacing. The second sub-pixel includes a second pixel electrode, wherein the second pixel electrode has a third spacing in a second main region and has a fourth spacing in a second minor region, and the third spacing is smaller than or equal to the fourth spacing, wherein the first spacing is greater than the third spacing. The second substrate is disposed opposite to the first substrate, and the display medium layer is disposed between the first substrate and the second substrate.

Another exemplary embodiment of the invention provides a display panel, which includes a first substrate, a pixel structure, a second substrate and a display medium layer. The pixel structure is disposed on the first substrate, and the pixel structure includes a first sub-pixel, a second sub-pixel and a third sub-pixel. The first sub-pixel includes a first pixel electrode, wherein the first pixel electrode has a first spacing in an A region of the first sub-pixel and has a second spacing in a B region of the first sub-pixel. The second sub-pixel includes a second pixel electrode, wherein the second pixel electrode has a third spacing in an A region of the second sub-pixel and has a fourth spacing in a B region of the second sub-pixel. The third pixel electrode includes a third pixel electrode, wherein the third pixel electrode has a fifth spacing in an A region of the third sub-pixel and has a sixth spacing in a B region of the third sub-pixel, and wherein the first spacing is greater than the fifth spacing, and the fifth spacing is greater than or equal to the third spacing. The second substrate is disposed opposite to the first substrate, and the display medium layer is disposed between the first substrate and the second substrate.

Another exemplary embodiment of the invention provides a display panel, which includes a first substrate, a pixel structure, a second substrate and a display medium layer. The pixel structure is disposed on the first substrate, and the pixel structure includes a first sub-pixel, a second sub-pixel and a third sub-pixel. The first sub-pixel includes a first pixel electrode, wherein the first pixel electrode has a first spacing in an A region of the first sub-pixel and has a second spacing in a B region of the first sub-pixel. The second sub-pixel includes a second pixel electrode, wherein the second pixel electrode has a third spacing in an A region of the second sub-pixel and has a fourth spacing in a B region of the second sub-pixel. The third pixel electrode includes a third pixel electrode, wherein the third pixel electrode has a fifth spacing in an A region of the third sub-pixel and has a sixth spacing in a B region of the third sub-pixel. The second spacing is equal to the sixth spacing, and the sixth spacing is greater than the fourth spacing. The second substrate is disposed opposite to the first substrate, and the display medium layer is disposed between the first substrate and the second substrate.

Another exemplary embodiment of the invention provides a display panel, which includes a first substrate, a pixel structure, a second substrate and a display medium layer. The pixel structure is disposed on the first substrate, and the pixel structure includes a first sub-pixel, a second sub-pixel and a third sub-pixel. The first sub-pixel includes a first pixel electrode, wherein the first pixel electrode in an A region of the first sub-pixel includes a part of the first pixel electrode having a first main spacing and the other part of the first pixel electrode having a first minor spacing. The first main spacing is greater than or equal to the first minor spacing, and a ratio of the part of the first pixel electrode having the first main spacing to the first pixel electrode in the A region of the first sub-pixel is a first ratio. The second sub-pixel includes a second pixel electrode, wherein the second pixel electrode in an A region of the second sub-pixel includes a part of the second pixel electrode having a third main spacing and the other part of the second pixel electrode having a third minor spacing. The third main spacing is greater than the third minor spacing, and a ratio of the part of the second pixel electrode having the third main spacing to the second pixel electrode in the A region of the second sub-pixel is a second ratio. The third sub-pixel includes a third pixel electrode, wherein the third pixel electrode in an A region of the third sub-pixel includes a part of the third pixel electrode having a fifth main spacing and the other part of the third pixel electrode having a fifth minor spacing. The fifth main spacing is greater than the fifth minor spacing, and a ratio of the part of third pixel electrode having the fifth main spacing to the third pixel electrode in the A region of the third sub-pixel is a third ratio, wherein the first ratio is greater than the third ratio, and the third ratio is greater than or equal to the second ratio. The first ratio is greater than the third ratio, and the third ratio is greater than or equal to the second ratio. The second substrate is disposed opposite to the first substrate, and the display medium layer is disposed between the first substrate and the second substrate.

Another exemplary embodiment of the invention provides a display panel, which includes a first substrate, a pixel structure, a second substrate and a display medium layer. The pixel structure is disposed on the first substrate, and the pixel structure includes a first sub-pixel, a second sub-pixel and a third sub-pixel. The first sub-pixel includes a first pixel electrode, wherein the first pixel electrode in a B region of the first sub-pixel includes a part of the first pixel electrode having a second main spacing and the other part of the first pixel electrode having a second minor spacing, the second main spacing is greater than or equal to the second minor spacing. Further, a ratio of the part of the first pixel electrode having the second main spacing to the first pixel electrode in the B region of the first sub-pixel is a fourth ratio. The second sub-pixel includes a second pixel electrode, wherein the second pixel electrode in a B region of the second sub-pixel includes a part of the second pixel electrode having a fourth main spacing and the other part of the second pixel electrode having a fourth minor spacing, the fourth main spacing is greater than the fourth minor spacing. Further, a ratio of the part of the second pixel electrode having the fourth main spacing to the second pixel electrode in the B region of the second sub-pixel is a fifth ratio. The third sub-pixel includes a third pixel electrode, wherein the third pixel electrode in a B region of the third sub-pixel includes a part of the third pixel electrode having a sixth main spacing and the other part of the third pixel electrode having a sixth minor spacing, the sixth main spacing is greater than the sixth minor spacing. A ratio of the part of the third pixel electrodes having the sixth main spacing to the third pixel electrode in the B region of the third sub-pixel is a sixth ratio. The fourth ratio is greater than or equal to the sixth ratio, and the sixth ratio is greater than the fifth ratio. The second substrate is disposed opposite to the first substrate, and the display medium layer is disposed between the first substrate and the second substrate.

Another exemplary embodiment of the invention provides a display panel, which includes a first substrate, a pixel structure, a second substrate and a display medium layer. The pixel structure is disposed on the first substrate, and the pixel structure includes a first sub-pixel, a second sub-pixel and a third sub-pixel. The first sub-pixel includes a first pixel electrode, wherein the first pixel electrode in a B region of the first sub-pixel includes a part of the first pixel electrode having a second main spacing and the other part of the first pixel electrode having a second minor spacing, the second main spacing is greater than or equal to the second minor spacing. Further, a ratio of the part of the first pixel electrode having the second main spacing to the first pixel electrode in the B region of the first sub-pixel is a fourth ratio. The second sub-pixel includes a second pixel electrode, wherein the second pixel electrode in a B region of the second sub-pixel includes a part of the second pixel electrode having a fourth main spacing and the other part of the second pixel electrode having a fourth minor spacing, the fourth main spacing is greater than the fourth minor spacing. Further, a ratio of the part of the second pixel electrode having the fourth main spacing to the second pixel electrode in the B region of the second sub-pixel is a fifth ratio. The third sub-pixel includes a third pixel electrode, wherein the third pixel electrode in a B region of the third sub-pixel includes a part of the third pixel electrode having a sixth main spacing and the other part of the third pixel electrode having a sixth minor spacing, the sixth main spacing is greater than the sixth minor spacing. A ratio of the part of third pixel electrodes having the sixth main spacing to the third pixel electrode in the B region of the third sub-pixel is a sixth ratio. The sixth ratio is greater than the fourth ratio, and the fourth ratio is greater than or equal to the fifth ratio. The second substrate is disposed opposite to the first substrate, and the display medium layer is disposed between the first substrate and the second substrate.

According to the exemplary embodiments of the invention, by adjusting the spacing of the pixel electrodes in the sub-pixel at the main region and the minor region, the ratios of areas in the main region of the pixel electrodes having different spacing located therein or the ratios of areas in the minor region of the pixel electrodes having different spacing located therein, or by modifying these various adjustment approaches, the color shift problem of the side view image of the sub-pixels can be mitigated. Hence, the display quality of a display panel is enhanced.

The invention and certain merits provided by the invention can be better understood by way of the following exemplary embodiments and the accompanying drawings, which are not to be construed as limiting the scope of the invention.

DETAILED DESCRIPTION OF DISCLOSED EMBODIMENTS

Figure 1:
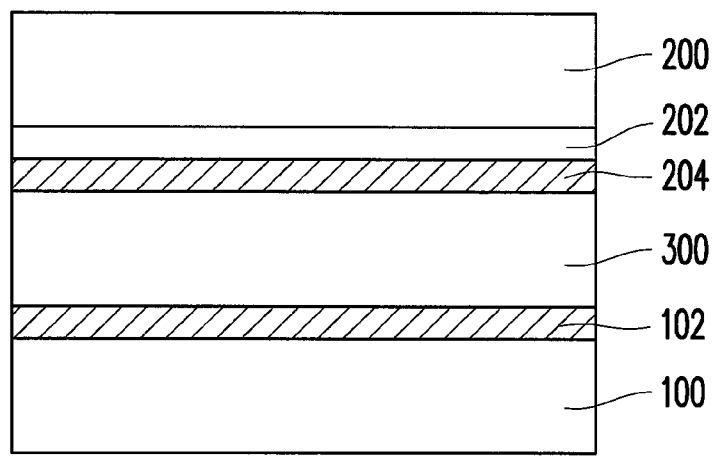
FIG. 1 is a schematic cross-sectional view of a display panel according to an exemplary embodiment of the invention.

FIG. 1 is a schematic cross-sectional view of a display panel according to an exemplary embodiment of the invention. Referring to FIG. 1, a display panel 10 includes a first substrate 100, a second substrate 200, and a display medium layer 300. In this exemplary embodiment, the display panel 10 includes, for example, a color filter array 202 and an electrode layer 204.

Figure 2:
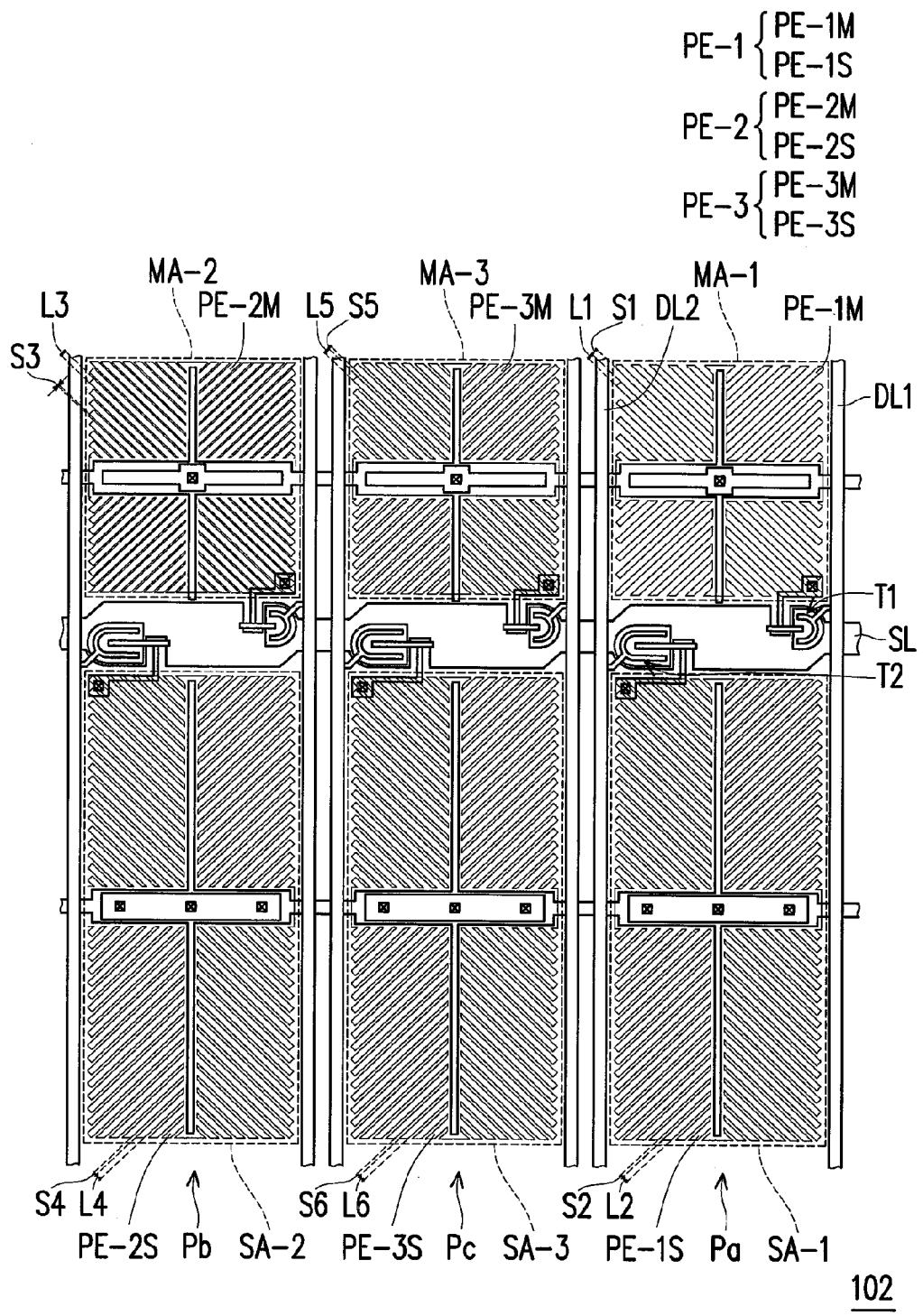
FIG. 2 is a schematic diagram of a pixel structure according to the first exemplary embodiment of the invention.

The first substrate 100 and the second substrate 200 are mainly used to carry devices or layers, wherein material thereof includes glass, quartz, organic polymers, or a non-transparent/reflective material (for example, conductive material, metal, wafer, ceramic or other appropriate materials) or other applicable materials. The pixel structure 102 is disposed on the first substrate 100, and the pixel structure 102 includes, for example, a first sub-pixel Pa, a second sub-pixel Pb and a third sub-pixel Pc (as shown in FIG. 2). The color filter array 202 is disposed on the second substrate 200, and the color filter array 202 includes a first color filter pattern, a second color filter pattern and a third color filter pattern. It is to be understood that the color filter array 202 being disposed on the second substrate 200 as illustrated in FIG. 1 is presented by way of example and not by way of limitation. In other exemplary embodiments, the color filter array 202 may be disposed on the first substrate 100. Moreover, an electrode layer 204 is further disposed on the color filter array 202. An electric field can be generated between the electrode layer 204 and the pixel structure 102 for controlling or driving the display medium layer 300. Moreover, the display medium layer 300 includes a liquid crystal medium or other appropriate display medium.

The above pixel structure 102 and color filter array 202 are disposed corresponding to each other. For example, the first sub-pixel Pa is disposed corresponding to the first color filter pattern, the second sub-pixel Pb is disposed corresponding to the second color filter pattern, while the third sub-pixel Pc is disposed corresponding to the third color filter pattern. According to an exemplary embodiment of the invention, if the first color filter pattern, the second color filter pattern and the third color filter pattern are respectively blue color, red color and green color filter patterns, the first, the second and the third sub-pixels Pa, Pb, Pc are respectively blue sub-pixel, red sub-pixel and green sub-pixel. The designs for the first, second and third sub-pixels Pa, Pb, and Pc can be any one of the designs as described in the following exemplary embodiments.

First Exemplary Embodiment

FIG. 2 is a schematic diagram of a pixel structure according to the first exemplary embodiment of the invention. Referring to FIG. 2, the pixel structure 102 is disposed on the first substrate 100 and includes a first sub-pixel Pa, a second sub-pixel Pb and a third sub-pixel Pc. The first sub-pixel Pa includes a first pixel electrode PE-1, wherein the first pixel electrode PE-1M has a first spacing S1 (for example, a spacing distance) and a first line-width L1 in a first main region MA-1, while the first pixel electrode PE-1S has a second spacing S2 and a second line-width L2 in a first minor region SA-1. Alternatively speaking, the first pixel electrode PE-1 includes the first pixel electrode PE-1M in the first main region MA-1 and the first pixel electrode PE-1S in the first minor region SA-1. Generally speaking, the first pixel electrode PE-1M in the first main region MA-1 is defined as the major pixel electrode, while the first pixel electrode PE-1S in the first minor region SA-1 is defined as the minor pixel electrode.

The second sub-pixel Pb includes a second pixel electrode PE-2, wherein the second pixel electrode PE-2M has a third spacing S3 and a third line-width L3 in a second main region MA-2, while the second pixel electrode PE-2S has a fourth spacing S4 and a fourth line-width L4 in a second minor region SA-2.

The third sub pixel Pc includes a third pixel electrode PE-3, wherein the third pixel electrode PE-3M has a fifth spacing S5 and a fifth line-width L5 in a third main region MA-3, while the third pixel electrode PE-3S has a sixth spacing S6 and a sixth line-width L6 in a third minor region SA-3.

In this exemplary embodiment, the first, second and third sub-pixels Pa, Pb, Pc further include a scan line SL, data lines DL1, DL2 and at least one active device. In this exemplary embodiment, two active devices T1 and T2 are illustrated. Herein, the scan line SL and data lines DL2, DL2 intersect each other and include an isolation layer therebetween. In other words, the extension direction of the scan line SL and the extension directions of the data lines DL1, DL2 are not parallel to each other. More preferably, the extension direction of the scan line SL is perpendicular to the extension directions of the data lines DL1, DL2. The active devices T1, T2 can be respectively a bottom gate type thin film transistor or a top gate type thin film transistor, and the active devices T1, T2 respectively include a gate, a channel, a source and a drain. The active device T1 is electrically connected with the scan line SL and the data line DL1, while the active device T2 is electrically connected with the scan line SL and the data line DL2.

Further, each active device T1, for example, is electrically connected with the first, second and third pixel electrodes PE-1M, PE-2M, PE-3M respectively in the first, second and third minor regions MA-1, MA-2, MA-3. Active devices T2, for example, are electrically connected with corresponding first, second and third pixel electrodes PE-1S, PE-2S PE-3S respectively in the first, second and third minor regions SA-1, SA-2, SA-3. The slit patterns of the first, second and third pixel electrodes PE-1M, PE-2M, PE-3M that are respectively in the first, second and third main regions MA-1, MA-2, MA-3 extend in four directions, for example, for the first, second and third pixel electrodes PE-1M, PE-2M, PE-3M to have four different domain regions so that a multi-domain is obtained. Similarly, the slit patterns of the above first, second and third pixel electrodes PE-1S, PE-2S PE-3S that are respectively in the first, second and third minor regions SA-1, SA-2, SA-3 extend in four directions, for example, for the first, second and third pixel electrodes PE-1S, PE-2S, PE-3S to have four different domain regions. Accordingly, 8 domain regions can be formed in the first, second and third sub-pixels Pa, Pb, Pc of this exemplary embodiment. It is noted that the structures of the first, second and third sub-pixels Pa, Pb, Pc having the above first, second and third main regions MA-1, MA-2, MA-3 and the first, second and third minor regions SA-1, SA-2, SA-3 are not limited to the layout structure as shown in FIG. 2. In other words, asides from the sub-pixel structures as shown in FIG. 2, other layouts or configurations of sub-pixels having a main region and a minor region for resolving the color shift problem of a display panel are also applicable to the invention. Although the disclosure herein refers to the sub-pixel structures as illustrated in FIG. 2, it is to be understood that the embodiment is presented by way of example and not by way of limitation.

In this exemplary embodiment, the spacing S1 to the spacing S4 of the pixel electrodes PE-1M, PE-2M in the main regions MA-1, MA-2 and the pixel electrodes PE-1S, PE-2S in the minor regions SA-1, SA-2 of the first sub-pixel Pa and the second sub-pixel Pb have the following relationship: the first spacing S1 of the first pixel electrode PE-1M in the first main region MA-1 is greater than the second spacing S2 of the first pixel electrode PE-1S in the first minor region SA-1, which is S1>S2; the third spacing S3 of the second pixel electrode PE-2M in the second main region MA-2 is less than or equal to the fourth spacing S4 of the second pixel electrode PE-2S in the second minor region SA-2, which is S3≤S4. In this exemplary embodiment, the fifth spacing S5 of the third pixel electrode PE-3M in the third main region MA-3 may be the same as or different from the sixth spacing S6 of the third pixel electrode PE-3S in the third minor region SA-3. In this exemplary embodiment, S3<S4 is illustrated as an example. However, in another exemplary embodiment, the third spacing S3 of the second pixel electrode PE-2M of the second sub-pixel Pb may be equal to the fourth spacing S4 of the second pixel electrode PE-2S, which is S3=S4.

In this exemplary embodiment, the spacing S1 and the spacing S3 of the pixel electrodes PE-1M, PE-2M in the main regions MA-1, MA-2 of the first sub-pixel Pa and the second sub-pixel Pb further have the following relationships: the first spacing S1 of the first pixel electrode PE-1M in the first main region MA-1 is greater than the third spacing S3 of the second pixel electrode PE-2M in the second main region MA-2, which is S1>S3.

In this exemplary embodiment, the first sub-pixel Pa is, for example, a blue sub-pixel, the second sub-pixel Pb is, for example, a red sub-pixel, and the third sub-pixel Pc is, for example, a green sub-pixel. In this exemplary embodiment, the spacing S1 to the spacing S4 of the pixel electrodes PE-1M, PE-2M in the main regions MA-1, MA-2 and the pixel electrodes PE-1S, PE-2S in the minor region SA-1, SA-2 of the first sub-pixel Pa (such as the blue sub-pixel) and the second sub-pixel Pb (such as the red sub-pixel) are adjusted to have the following relationships: S1>S2, S3≤S4, and S1>S3. In this exemplary embodiment, the spacing S2, the spacing S4, the spacing S6 of the pixel electrodes PE-1S, PE-2S, PE-3S of the first, second and third minor regions SA-1, SA-2, SA-3 are the same as the spacing S5 of the third pixel electrode PE-3M of the third main region MA-3, which is S2=S4=S5=S6. The line-widths L1 to L6 of the first, second and third pixel electrodes PE-1M, PE-2M, PE-3M, PE-1S, PE-2S, PE-3S are, for example, the same. The line-widths Ln (L1 to L6) of the first, second and third pixel electrodes PE-1M, PE-2M, PE-3M, PE-1S, PE-2S, PE-3S and the spacing Sn (S1 to S6), for example, have the following relationships: 3/2<Ln/Sn<3/6, 4/2<Ln/Sn<4/6 or 5/2<Ln/Sn<5/6. In this exemplary embodiment, using the spacing S5 of the pixel electrode PE-3M of the third sub-pixel Pc as a standard, the spacing S1 of the pixel electrode PE-1M of the first sub-pixel Pa is adjusted to be bigger and the spacing S3 of the pixel electrode PE-2M of the second sub-pixel Pb is adjusted to be smaller to achieve S1>S2, S3≤S4 and S1>S3. Although the disclosure herein refers to S1>S5>S3 as an example, the spacing S5 of the third pixel electrode PE-3M is not being limited in this exemplary embodiment.

In this exemplary embodiment, the spacing S2 and the spacing S4 of the pixel electrodes PE-1S, PE-2S in the minor regions SA-1, SA-2 of the first sub-pixel Pa and the second sub-pixel Pb are, for example, the same. In another exemplary embodiment, the second spacing S2 of the first pixel electrode PE-1S of the first sub-pixel Pa can be greater than the fourth spacing S4 of the second pixel electrode PE-2S of the second sub-pixel Pb, which is S2>S4.

In this exemplary embodiment, the spacing S1 to the spacing S4 of the pixel electrodes PE-1M, PE-2M in the main regions MA-1, MA-2 and the pixel electrodes PE-1S, PE-2S in the minor regions SA-1, SA-2 of the first sub-pixel Pa (such as the blue sub-pixel) and the second sub-pixel Pb (such as the red sub-pixel) are adjusted to have the relationships S1>S2, S3≤S4 and S1>S3 to mitigate the color shift problems in a side view image, for example. Accordingly, the display quality of the display panel is enhanced. More specifically, since the exemplary embodiment is accomplished through adjusting the spacing of the pixel electrodes of the sub-pixels, the fabrication method is easily integrated to obviate a substantial increase in the manufacturing cost of a display panel.

The second to the fourth exemplary embodiments are discussed below. Since the sub-pixel structures in the second to the fourth exemplary embodiments are substantially the same as that in the first exemplary embodiment, and the major difference between the exemplary embodiments lies in the relationship of the spacing of the pixel electrodes of the sub-pixels, the following disclosure is directed to the differences among the exemplary embodiments, while their commonalities will be omitted. Moreover, another exemplary embodiment can be achieved by modifying the relationships of the spacing of the pixel electrode described in any of the exemplary embodiments.

Second Exemplary Embodiment

Figure 3:
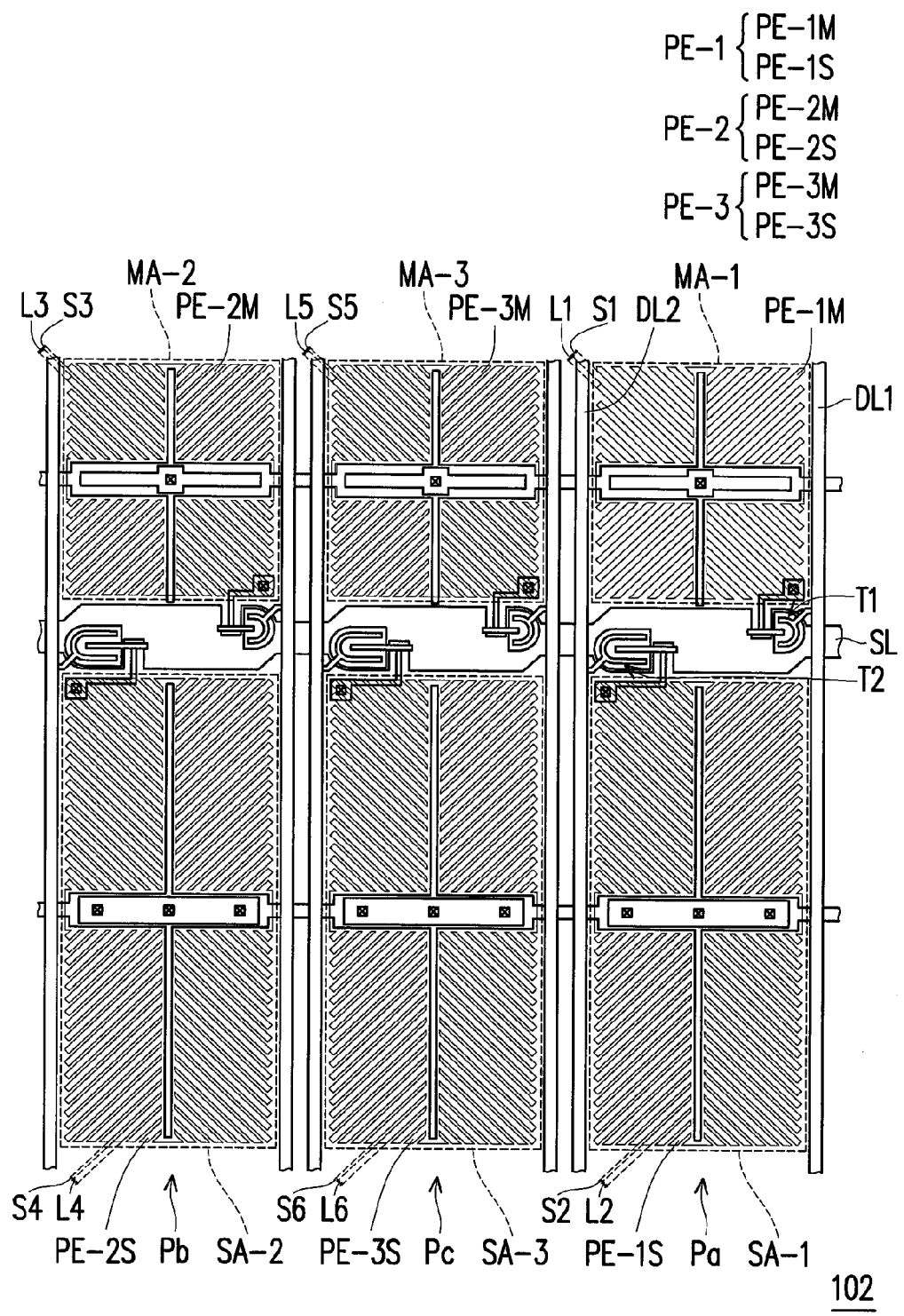
FIG. 3 is a schematic diagram of a pixel structure according to the second exemplary embodiment of the invention.

Referring to FIG. 3, in this exemplary embodiment, the spacing S1, the spacing S3 and the spacing S5 of the pixel electrodes PE-1M, PE-2M, PE-3M in the main regions MA-1, MA-2, MA-3 of the first sub-pixel Pa, the second sub-pixel Pb and the third sub-pixel Pc have the following relationships: the first spacing S1 of the first pixel electrode PE-1M of the first sub-pixel Pa is greater than the fifth spacing S5 of the third pixel electrode PE-3M of the third sub-pixel Pc, and the fifth spacing S5 of the third pixel electrode PE-3M of the third sub-pixel Pc is greater than or equal to the third spacing S3 of the second pixel electrode PE-2M of the second sub-pixel Pb, which is S1>S5≥S3. In this exemplary embodiment, each of the main regions MA-1, MA-2, MA-3 can be also referred to as the A region, and each of the minor regions SA-1, SA-2, SA-3 can be also referred to as the B region. In this exemplary embodiment, as shown in FIG. 3, S1>S5=S3 is used as an example. In another exemplary embodiment, as shown in FIG. 2, the fifth spacing S5 of the third pixel electrode PE-3M of the third sub-pixel Pc may be greater than the third spacing S3 of the second pixel electrode PE-2M of the second sub-pixel Pb, which is S1>S5>S3. In this exemplary embodiment, the first sub-pixel Pa is, for example, a blue sub-pixel, the second sub-pixel is, for example, a red sub-pixel, and the third sub-pixel Pc is a green sub-pixel, for example.

Third Exemplary Embodiment

Figure 4:
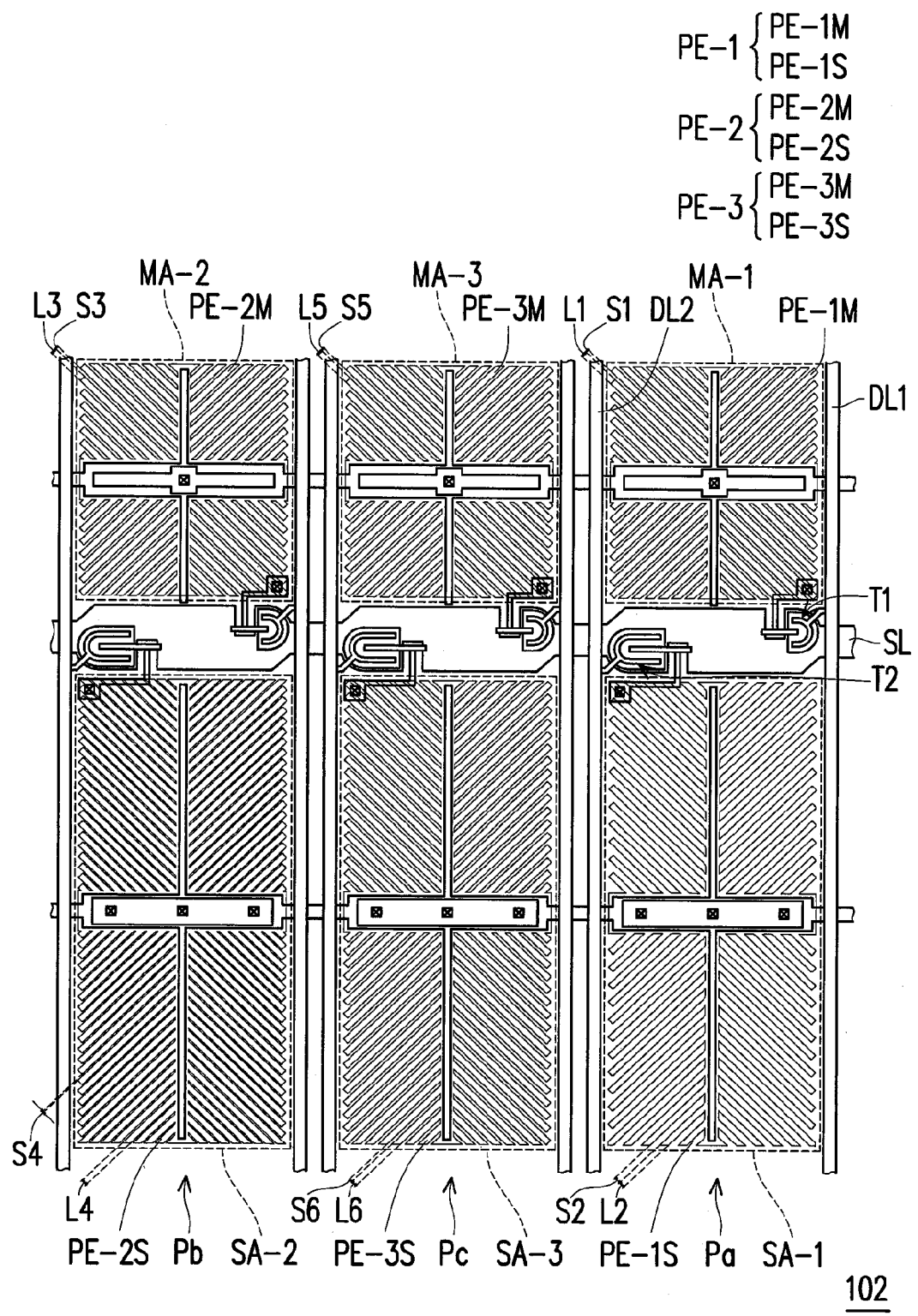
FIG. 4 is a schematic diagram of a pixel structure according to the third exemplary embodiment of the invention.

Referring to FIG. 4, in this exemplary embodiment, the spacing S2, the spacing S4 and the spacing S6 of the pixel electrodes PE-1S, PE-2S, PE-3S in the minor regions SA-1, SA-2, SA-3 of the first sub-pixel Pa, the second sub-pixel Pb and the third sub-pixel Pc have the following relationships: the second spacing S2 of the first pixel electrode PE-1S of the first sub-pixel Pa is greater than or equal to the sixth spacing S6 of the third pixel electrode PE-3S of the third sub-pixel Pc, and the sixth spacing S6 of the third pixel electrode PE-3S of the third sub-pixel Pc is greater than the fourth spacing S4 of the second pixel electrode PE-2S of the second sub-pixel Pb, which is S2≥S6>S4. In this exemplary embodiment, each of the minor regions SA-1, SA-2, SA-3 can be also referred to as the A region, and each of the main regions MA-1, MA-2, MA-3 can be also referred to as the B region. In this exemplary embodiment, as shown in FIG. 4, S2>S6>S4 is used as an example. In another exemplary embodiment (not shown), the second spacing S2 may be equal to the sixth spacing S6 of the third pixel electrode PE-3S of the third sub-pixel Pc, which is S2=S6>S4. In this exemplary embodiment, the first sub-pixel Pa is, for example, a blue sub-pixel, the second sub-pixel is, for example, a red sub-pixel, and the third sub-pixel Pc is a green sub-pixel, for example.

Fourth Exemplary Embodiment

Figure 5:
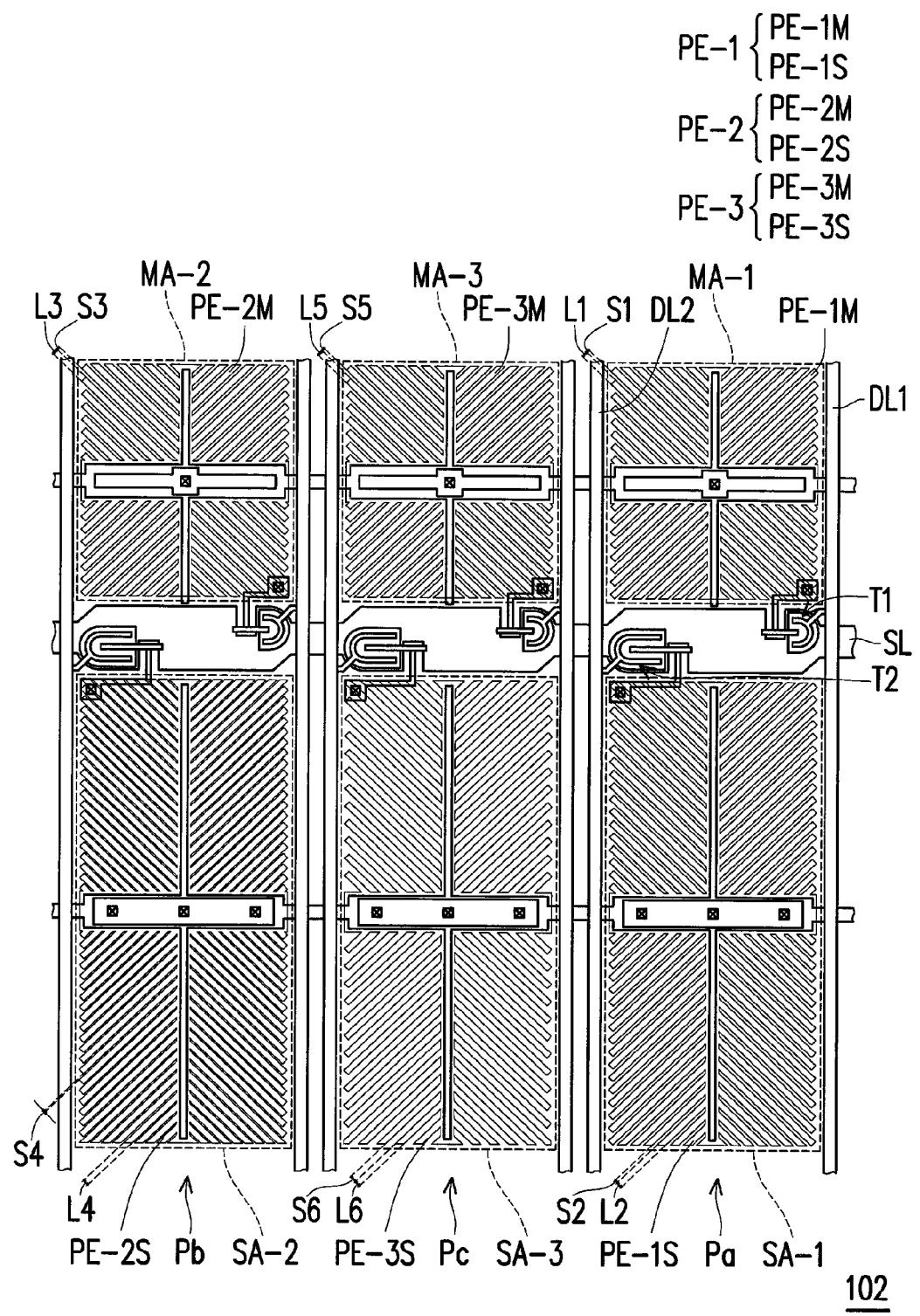
FIG. 5 is a schematic diagram of a pixel structure according to the fourth exemplary embodiment of the invention.

Referring to FIG. 5, in this exemplary embodiment, the spacing S2, the spacing S4 and the spacing S6 of the pixel electrodes PE-1S, PE-2S, PE-3S in the minor regions SA-1, SA-2, SA-3 of the first sub-pixel Pa, the second sub-pixel Pb and the third sub-pixel Pc have the following relationships: the second spacing S6 of the third pixel electrode PE-3S of the third pixel electrode Pc, for example, is greater than the second spacing S2 of the first pixel electrode PE-1S of the first sub-pixel Pa, and the second spacing S2 of the first pixel electrode PE-1S of the first sub-pixel Pa is greater than or equal to the fourth spacing S4 of the second pixel electrode PE-2S of the second sub-pixel Pb, which is S6>S2≥S4. In this exemplary embodiment, each of the minor regions SA-1, SA-2, SA-3 can be also referred to as the A region, and each of the main regions MA-1, MA-2, MA-3 can be also referred to as the B region. In this exemplary embodiment, as shown in FIG. 5, S6>S2>S4 is used as an example. In another exemplary embodiment (not shown), the second spacing S2 of the first pixel electrode PE-1S of the first sub-pixel Pa may be equal to the fourth spacing S4 of the second pixel electrode PE-2S of the second sub-pixel Pb, which is S6>S4=S2. In this exemplary embodiment, the first sub-pixel Pa is, for example, a blue sub-pixel, the second sub-pixel is, for example, a red sub-pixel, and the third sub-pixel Pc is a green sub-pixel, for example.

According to the above exemplary embodiments, by adjusting the spacing of the pixel electrodes in the main regions and the minor regions of the sub-pixels, the color shift problems in a side view image, such as bluish at low gray level, greenish or reddish at mid gray level, and greenish at high gray level, are mitigated. Hence, the display quality of the display panel is enhanced.

The merits discussed in the above exemplary embodiments are demonstrated by the following experimental examples. In one experimental example, the first spacing S1 of the first pixel electrode PE-1M in the first main region MA-1 is designed to be greater than the second spacing S2 of the first pixel electrode PE-1S in the first minor region SA-1, which is S1>S2. More specifically, in the first sub-pixel Pa (blue sub-pixel), the ratio of the line-width L1 to the spacing S1 of the first pixel electrode PE-1M in the first main region MA-1 is 5/4, and the ratio of the line-width L2 to the spacing S2 of the first pixel electrode PE-1S in the first minor region SA-1 is 5/3. In the second sub-pixel Pb (red sub-pixel), the ratio of the line width L3 to the spacing S3 of the second pixel electrode PE-2M in the second main region MA-2 and the ratio of the line-width L4 to spacing S4 of the second pixel electrode PE-2S in the second minor region SA-2 are both 5/3. When the line-width and spacing of the pixel electrodes in the first sub-pixel Pa, the second sub-pixel Pb and the third sub-pixel Pc are as described above, the gray-level and correlated color temperature relationship of a liquid crystal display panel is as shown in FIG. 6A and the gray-level and chromaticity difference (delta v') relationship is as shown in FIG. 6B.

Figure 6A:
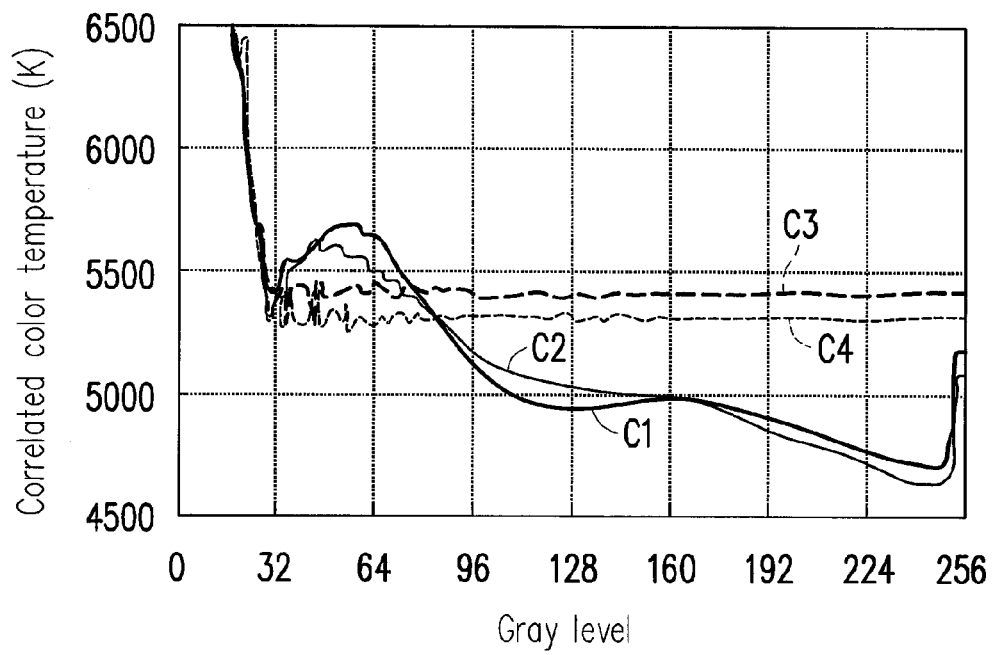
FIG. 6A is a graph showing the relationship between the gray level and correlated color temperature of the liquid crystal display panel of an experimental example of the invention.

As shown in FIG. 6A, the curve C1 denotes a gray-level and correlated color temperature relationship obtained from viewing the LCD having the conventional pixel structure (in which the line-width/spacing ratios of the pixel electrode are 5/3) at a 45° viewing angle; the curve C2 denotes a gray-level and correlated color temperature relationship obtained from viewing the LCD having the pixel structure of the experimental example of the invention (in which the line-width L1/spacing S1 ratio of the pixel electrode PE-1M is 5/4, while the ratios of the line-widths L2 to L6 and the spacing S2 to S6 of the remaining pixel electrodes PE-1S, PE-2M, PE-2S, PE-3M, PE-3S are 5/3) at a 45° viewing angle; the curve C3 denotes a gray-level and correlated color temperature relationship obtained from viewing the LCD having the conventional pixel structure at the 0° viewing angle; the curve C4 denotes a gray-level and correlated color temperature relationship obtained from viewing the LCD having the pixel structure of the experimental example of the invention at the 0° viewing angle. In FIG. 6B, the curve C5 denotes a gray-level and chromaticity difference (delta v') relationship obtained from viewing the LCD having the conventional pixel structure at a 45° viewing angle; the curve C6 denotes a gray-level and color shift relationship obtained from viewing the LCD having the pixel structure of the experimental example of the invention at a 45° viewing angle; the curve C7 denotes a gray-level and color shift relationship obtained from viewing the LCD from the 0° viewing angle.

Figure 6B:
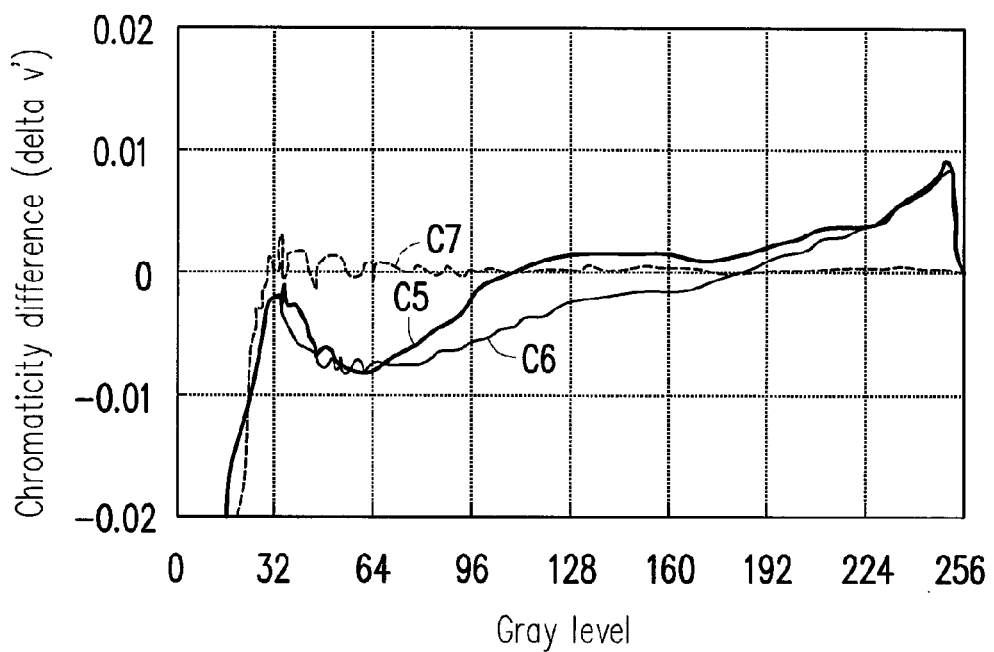
FIG. 6B is a graph showing the relationship between the gray level and chromaticity difference (delta v') of the liquid crystal display panel of an experimental example of the invention.

According to FIGS. 6A and 6B, in the first sub-pixel Pa (blue sub-pixel), when the spacing S1 of the first pixel electrode PE-1M in the first main region MA-1 is designed to be greater than the spacing S2 of the first pixel electrode PE-1S in the first minor region SA-1, the color shift problem of a side view image is definitely being mitigated, comparing with the conventional pixel structure design.

Similarly, in another experimental example, the spacing S3 of the second pixel electrode PE-2M in the second main region MA-2 is designed to be smaller than the spacing S4 of the second pixel electrode PE-2S in the second minor region SA-2, which is S3<S4. More specifically, the ratio of the line-width L3 to the spacing S3 of the second pixel electrode PE-2M in the second main region MA-2 of the second sub-pixel Pb (red sub-pixel) is 5/2 and the ratio of the line-width L4 to spacing S4 of the second pixel electrode PE-2S in the second minor region SA-2 is 5/3. The ratios of the line-widths to the spacing of the pixel electrodes PE-1M, PE-1S, PE-3M, PE-3S in the main regions MA-1, MA-3, and the minor regions SA-1, SA-3 in the first sub-pixel Pa (blue sub-pixel) and the third sub-pixel Pc (green sub-pixel) are 5/3. When the line-widths and spacing of the pixel electrodes in the first sub-pixel Pa, the second sub-pixel Pb and the third sub-pixel Pc are as described above, the gray-level and correlated color temperature relationship of a liquid crystal display panel is as shown in FIG. 7A and the gray-level and chromaticity difference relationship of a liquid crystal display panel is as shown in FIG. 7B.

Figure 7A:
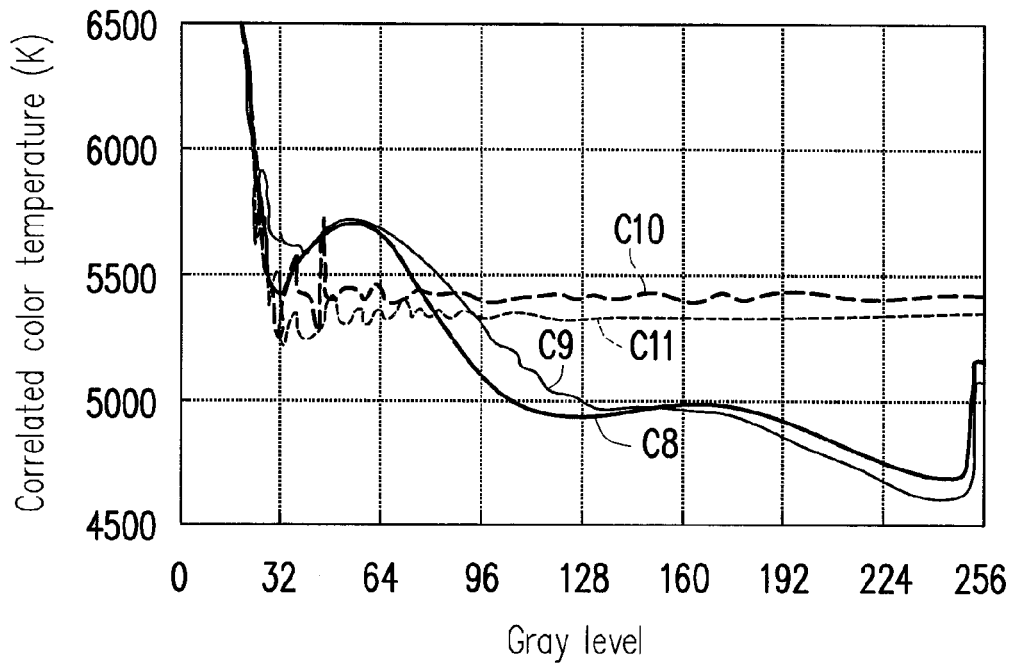
FIG. 7A is a graph showing the relationship between the gray level and correlated color temperature of the liquid crystal display panel of an experimental example of the invention.

As shown in FIG. 7A, the curve C8 denotes a gray-level and correlated color temperature relationship obtained from viewing the LCD having the conventional pixel structure (in which the line-width/spacing ratios of all pixel electrode are 5/3) at a 45° viewing angle; the curve C9 denotes a gray-level and correlated color temperature relationship obtained from viewing the LCD having the pixel structure of the experimental example of the invention (which is a ratio of line-width L3/spacing S3 of the pixel electrode PE-2M is 5/2, while the ratios of the line-widths L2 to L6 to the spacing S2 to S6 of the remaining pixel electrodes PE-1S, PE-1M, PE-2S, PE-3M, PE-3S are 5/3) at a 45° viewing angle; the curve C10 denotes a gray-level and correlated color temperature relationship obtained from viewing the LCD having the conventional pixel structure at the 0° viewing angle; the curve C11 denotes a gray-level and correlated color temperature relationship obtained from viewing the LCD having the pixel structure of the experimental example of the invention at the 0° viewing angle. In FIG. 7B, the curve C12 denotes a gray-level and chromaticity difference(delta u') relationship obtained from viewing the LCD having the conventional pixel structure at a 45° viewing angle; the curve C13 denotes a gray-level and chromaticity difference(delta u') relationship obtained from viewing the LCD having the pixel structure of the experimental example of the invention at a 45° viewing angle; the curve C14 denotes a gray-level and color shift relationship obtained from viewing the LCD at the 0° viewing angle.

Figure 7B:
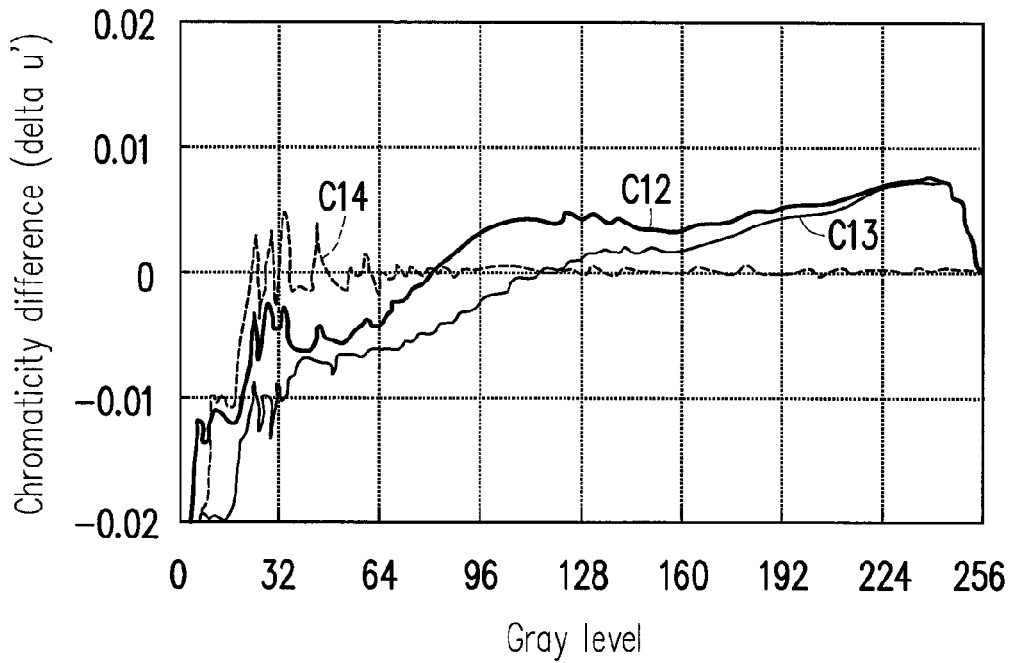
FIG. 7B is a graph showing the relationship between the gray level and chromaticity difference (delta u') of the liquid crystal display panel of an experimental example of the invention.

According to FIGS. 7A and 7B, for the second sub-pixel Pb (red sub-pixel), when the spacing S3 of the second pixel electrode PE-2M in the second main region MA-2 is designed to be less than the spacing S4 of the second pixel electrode PE-2S in the second minor region SA-2, the color shift problem of a side view image is certainly being mitigated, comparing with the conventional pixel structure design.

In another experimental example, the spacing of the pixel electrodes has the following relationships: S1>S5>S3 and S2=S6>S4. More specifically, in the first sub-pixel Pa (blue sub-pixel), the ratio of the line-width L1 to the spacing S1 of the first pixel electrode PE-1S in the first main region MA-1 is 5/4, and the ratio of the line-width L2 to the spacing S2 of the first pixel electrode PE-1S at the first minor region SA-1 is 5/4. In the second sub-pixel Pb (red sub-pixel), the ratio of line-width L3 to the spacing S3 of the second pixel electrode PE-2M in the second main region MA-2 is 5/2.5, and the ratio of the line-width L4 to the spacing S4 of the second pixel electrode PE-2S in the second minor region SA-2 is 5/3. In the third sub-pixel Pc (green sub-pixel), the ratio of line-width L5 to the spacing S5 of the third pixel electrode PE-3M in the third main region MA-3 is 5/3, and the ratio of the line-width L6 and the spacing S6 of the third pixel electrode PE-3S at the third minor region SA-3 is 5/4. When the line-widths and spacing of the pixel electrodes in the first sub-pixel Pa, the second sub-pixel Pb, the third sub-pixel Pc are as described above, the gray-level and color shift relationship of a liquid crystal display panel is as shown in FIG. 8A and FIG. 8B.

Figure 8A:
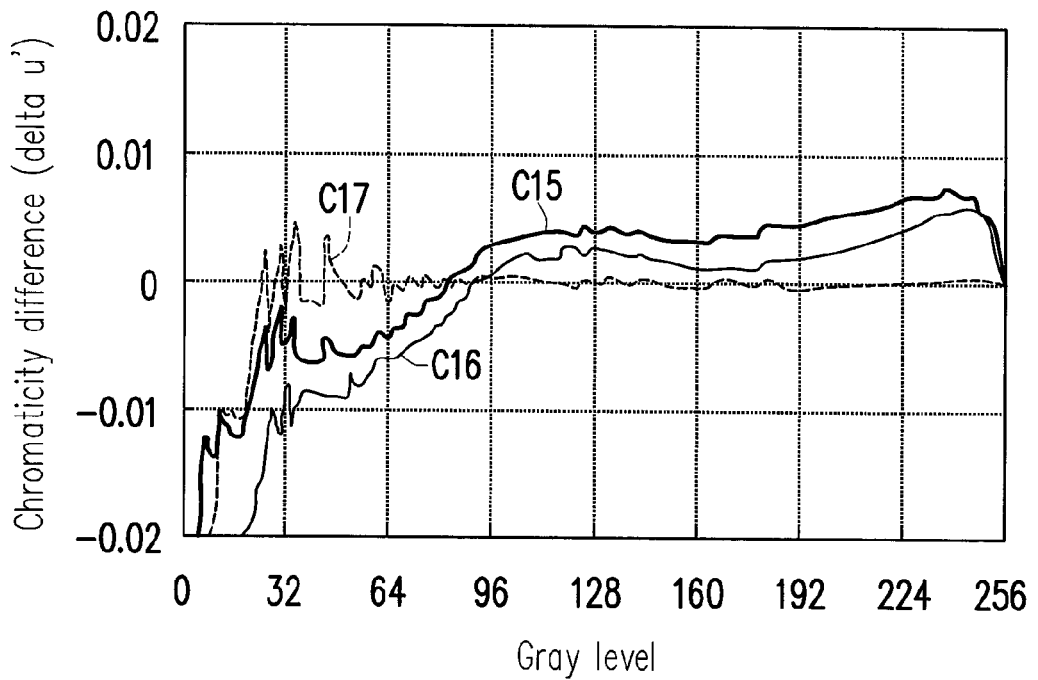
FIG. 8A is a graph showing the relationship between the gray level and chromaticity difference (delta u') of the liquid crystal display panel of an experimental example of the invention.
Figure 8B:
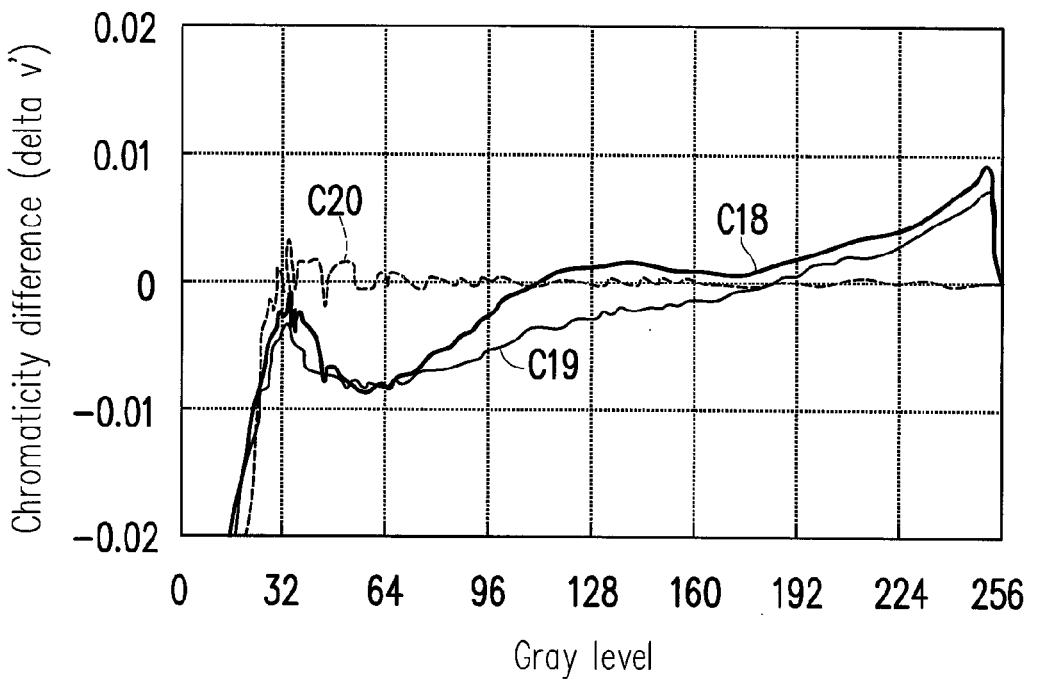
FIG. 8B is a graph showing the relationship between the gray level and chromaticity difference (delta v') of the liquid crystal display panel of an experimental example of the invention.

As shown in FIGS. 8A and 8B, the curves C15, C18 denote a gray-level and chromaticity difference relationship obtained from viewing the LCD having the conventional pixel structure (in which the line-width/spacing ratios of all pixel electrode are 5/3) at a 45° viewing angle; the curves C16, C19 denote a gray-level and chromaticity difference relationship obtained viewing the LCD having the pixel structure of the above experimental example of the invention at a 45° viewing angle; the curves C17, C20 denote a gray-level and chromaticity difference relationship obtained from viewing the LCD at the 0° viewing angle.

According to FIGS. 8A and 8B, the spacing of the pixel electrodes of sub-pixels are designed to have the relationships of S1>S5>S3 and S2=S6>S4, and the chromaticity difference problem of a side view image is certainly being mitigated, comparing with the conventional pixel structure design.

Fifth Exemplary Embodiment

Figure 9:
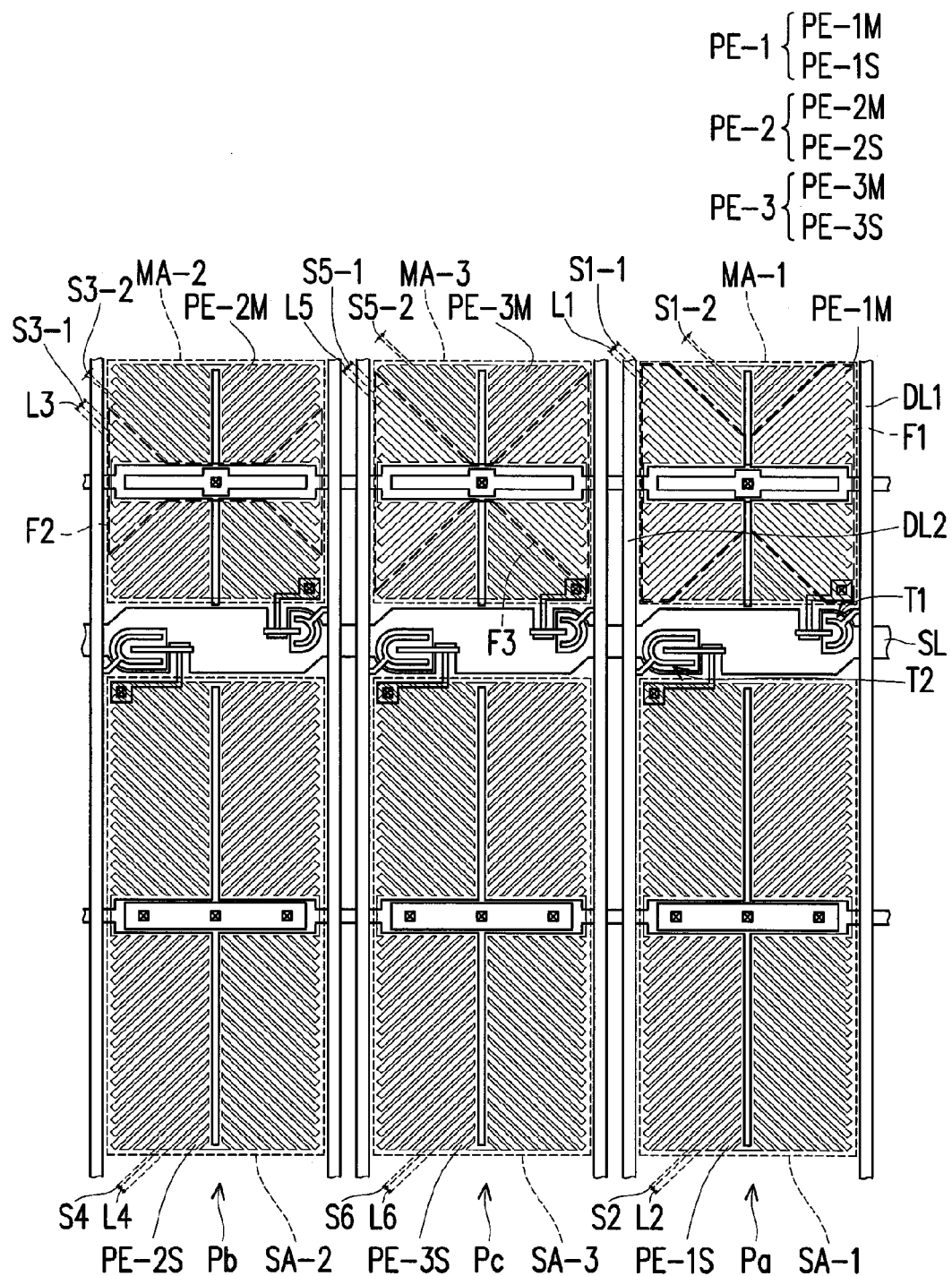
FIG. 9 is a schematic diagram of a pixel structure according to the fifth exemplary embodiment of the invention.

FIG. 9 is a schematic diagram of a pixel structure according to the fifth exemplary embodiment of the invention. The structural components of the pixel structure of this exemplary embodiment are substantially similar to those disclosed in the first exemplary embodiment. The following disclosure is directed to the spacing relationship of the pixel electrodes. Referring to FIG. 9, in this exemplary embodiment, the pixel structure 102 is disposed on a first substrate 100, and the pixel structure 102 includes a first sub-pixel Pa, a second sub-pixel Pb, and a third sub-pixel Pc. The first sub-pixel Pa includes a first pixel electrode PE-1, wherein the first pixel electrode PE-1M in a first main region MA-1 includes a part F1 of the first pixel electrode PE-1M having a first main spacing S1-1 and the other part of the first pixel electrode PE-1M having a first minor spacing S1-2. The first main spacing S1-1 is greater than or equal to the first minor spacing S1-2. Moreover, a ratio of the part F1 of the first pixel electrode PE-1M having the first main spacing S1-1 to the first pixel electrode PE-1M in the first main region MA-1 is a first ratio R1. In this exemplary embodiment, the first main spacing S1-1 being greater than the first minor spacing S1-2 is used as an example. In another exemplary embodiment, the first main spacing S1-1 can be equal to the first minor spacing S1-2.

The second sub-pixel Pb includes a second pixel electrode PE-2, wherein the second pixel electrode PE-2M in a second main region MA-2 includes a part F2 of the second pixel electrode PE-2M having a third main spacing S3-1 and the other part of the second pixel electrode PE-2M having a third minor spacing S3-2. The third main spacing S3-1 is greater than the third minor spacing S3-2. Moreover, a ratio of the part F2 of the second pixel electrode PE-2M having the third main spacing S3-1 to the second pixel electrode PE-2M in the second main region MA-2 is a second ratio R2.

The third sub-pixel Pc includes a third pixel electrode PE-3, wherein the third pixel electrode PE-3M in a first main region MA-3 includes a part F3 of the third pixel electrode PE-3 having a fifth main spacing S5-1 and the other part of the third pixel electrode PE-3 having a fifth minor spacing S5-2. The fifth main spacing S5-1 is greater than the fifth minor spacing S5-2. Moreover, a ratio of the part F3 of the third pixel electrode PE-3M having the fifth main spacing S5-1 to the third pixel electrode PE-3M in the third main region MA-3 is a third ratio R3, wherein the first ration R1 is greater than the third ratio R3, and the third ratio R3 is greater or equal to the second ratio R2, which is R1>R3≥R2. In this exemplary embodiment, each of the main regions MA-1, MA-2, MA-3 can be also referred to as the A region, and each of the minor regions SA-1, SA-2, SA-3 can be also referred to as the B region. The first ration R1 is less than or equal to 1. When the first ratio R1 is 1, the first main spacing S1-1 and the first minor spacing S1-2 of the first pixel electrode PE-1M disposed in the first main region MA-1 are identical, which is S1-1=S1-2. Each of the second ratio R2 and the third ratio R3 are, for example, is greater than 0 and is less than 1. In this exemplary embodiment, R1>R2>R3 is used as an illustrative example. However, in another exemplary embodiment (not shown), it is possible to have R1>R3=R2. In this exemplary embodiment, the first pixel electrode PE-1 further includes the first pixel electrode PE-1S in a first minor region SA-1, the second pixel electrode PE-2 further includes the second pixel electrode PE-2S in a second minor region SA-2, and the third pixel electrode PE-3 further includes the third pixel electrode PE-3S in a third minor region SA-3.

In this exemplary embodiment, the first sub-pixel Pa is, for example, a blue sub-pixel, the second sub-pixel Pb is, for example, a red sub-pixel, and the third sub-pixel Pc is, for example, a green sub-pixel. In this exemplary embodiment, the minor spacing of S1-2, S3-2, S5-2 of the first, second and third pixel electrodes PE-1M, PE-2M, PE-3M at the first, second and third main regions MA-1, MA-2, MA-3, and the spacing S2, S4, S6 of the first, second and third pixel electrodes PE-1S, PE-2S, PE-3S at the first, second and third minor regions SA-1, S1-2, SA-3 are, for example, the same. The main spacing S1-1, S3-1, S5-1 of the first, second and third pixel electrodes PE-1M, PE-2M, PE-3M at the first, second and third main regions MA-1, MA-2, MA-3 are, for example, the same. The line-widths L1 to L6 of the first, second and third pixel electrodes PE-1M, PE-2M, PE-3M, PE-1S, PE-2S, PE-3S are, for example, the same. Alternatively speaking, according to the exemplary embodiments, only the main spacing S1-1, S3-1, S5-1 of the first, second and third pixel electrodes PE-1M, PE-2M, PE-3M at the first, second and third main regions MA-1, MA-2, MA-3 are being adjusted.

In the exemplary embodiment, by adjusting the ratios of the pixel electrodes with the different spacing occupied in the main region and the relationships between the above ratios, the color shift problems in a side view image, such as bluish at low gray level, greenish or reddish at mid gray level, and greenish at high gray level, are mitigated. Hence, the display quality of the display panel is enhanced.

Sixth Exemplary Embodiment

Figure 10:
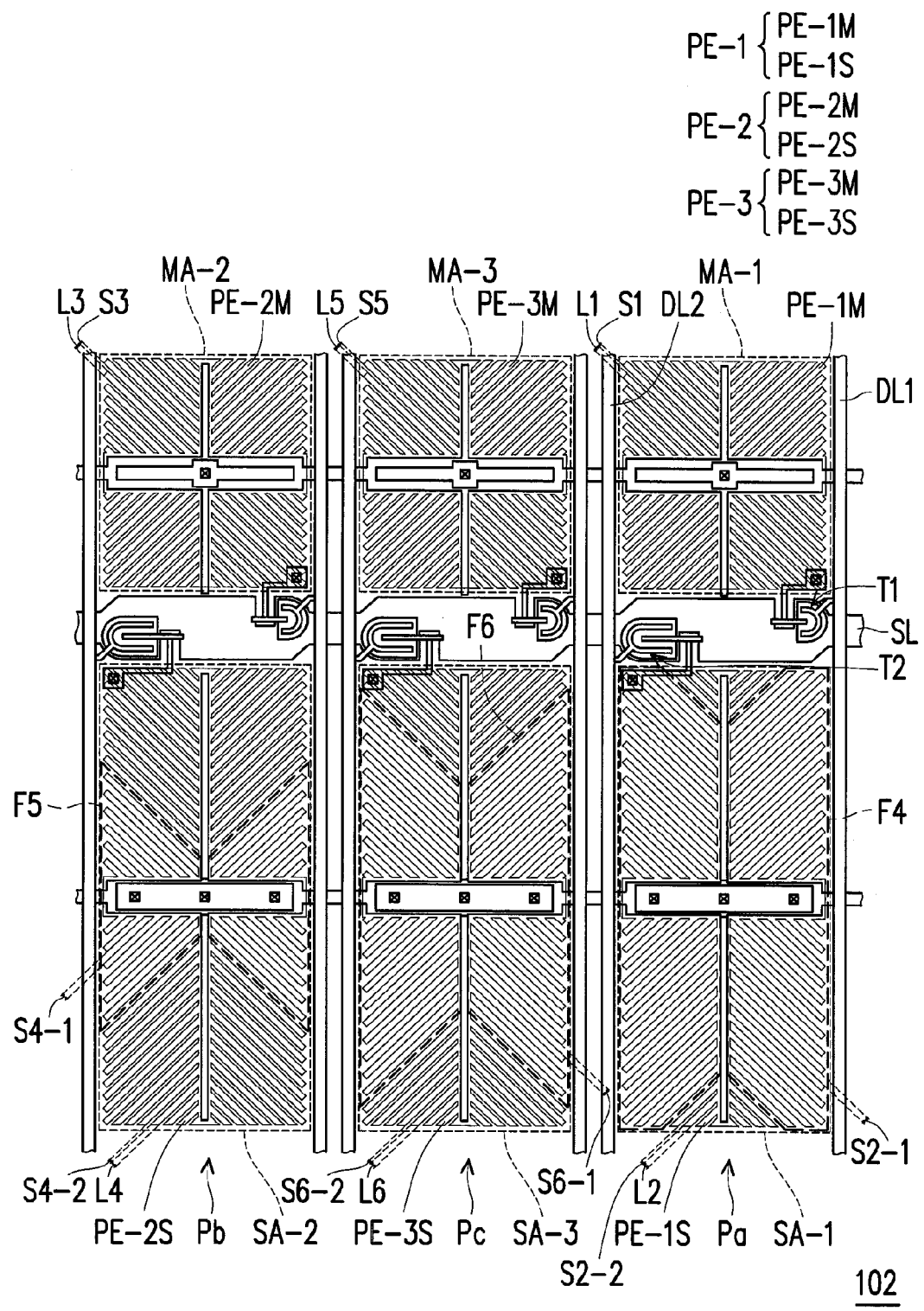
FIG. 10 is a schematic diagram of a pixel structure according to the sixth exemplary embodiment of the invention.

FIG. 10 is a schematic diagram of a pixel structure according to the sixth exemplary embodiment of the invention. The structural components of the pixel structure of this exemplary embodiment are substantially similar to those disclosed in the first exemplary embodiment. The following disclosure is directed to the spacing relationship of the pixel electrodes. Referring to FIG. 10, in this exemplary embodiment, the pixel structure 102 is disposed on a first substrate 100, and the pixel structure 102 includes a first sub-pixel Pa, a second sub-pixel Pb, and a third sub-pixel Pc. The first sub-pixel Pa includes a first pixel electrode, PE-1, wherein the first pixel electrode PE-1S in a first minor region SA-1 includes a part F4 of the first pixel electrode PE-1S having a second main spacing S2-1 and the other part of the first pixel electrode PE-1S having a second minor spacing S2-2. The second main spacing S2-1 is greater than or equal to the second minor spacing S2-2. Moreover, a ratio of the part F4 of the first pixel electrode PE-1S having the second main spacing S2-1 to the first pixel electrode PE-1S in the first minor region SA-1 is a fourth ratio R4. In this exemplary embodiment, the second main spacing S2-1 being greater than the second minor spacing S2-2 is used as an example. In another exemplary embodiment (not shown), the second main spacing S2-1 can be equal to the second minor spacing S2-2.

The second sub-pixel Pb includes a second pixel electrode PE-2, wherein the second pixel electrode PE-2S in a second minor region SA-2 includes a part F5 of the second pixel electrode PE-2S having a fourth main spacing S4-1 and the other part of the second pixel electrode PE-2S having a fourth minor spacing S4-2. The fourth main spacing S4-1 is greater than the fourth minor spacing S4-2. Moreover, a ratio of the part F5 of the second pixel electrode PE-2S having the fourth main spacing S4-1 to the second pixel electrode PE-2S in the second minor region SA-2 is a fifth ratio R5.

The third sub-pixel Pc includes a third pixel electrode PE-3, wherein the third pixel electrode PE-3S in a third minor region SA-3 includes a part F6 of the third pixel electrode PE-3S having a sixth main spacing S6-1 and the other part of the third pixel electrode PE-3S having a sixth minor spacing S6-2. The sixth main spacing S6-1 is greater than or equal to the sixth minor spacing S6-2. Moreover, a ratio of the part F6 of the third pixel electrode PE-3S having the sixth main spacing S6-1 to the third pixel electrode PE-3S in the third minor region SA-3 is a sixth ratio R6, wherein the fourth ratio R4 is greater than or equal to the sixth ratio R6, and the sixth ratio R6 is greater the fifth ratio R5, which is R4≥R6>R5. In this exemplary embodiment, each of the minor regions SA-1, SA-2, SA-3 can be also referred to as the A region, and each of the main regions MA-1, MA-2, MA-3 can be also referred to as the B region. In this exemplary embodiment, the sixth main spacing S6-1 being greater than the six minor spacing S6-2 is used as an example. In another exemplary embodiment (not shown), the sixth main spacing S6-1 may be equal to the sixth minor spacing S6-2. The fourth ratio R4 is less than or equal to 1, and the fourth ratio R4 is 1 means the second minor spacing S2-2 and the second main spacing S2-1 of the first pixel electrode PE-1S disposed in the first minor region SA-1 are identical, which is S2-1=S2-2. The sixth ratio R6 is less than or equal to 1, and the sixth ratio R6 is equal to 1 means the sixth main spacing S6-1 and the sixth minor spacing S6-2 of the third pixel electrode PE-3S disposed in the third minor region SA-3 are identical, which is S6-1=S6-2. The fifth ratio R5 is, for example, greater than 0 and less than 1. In this exemplary embodiment, R4>R6>R5 is used as an example. In another exemplary embodiment, R4=R6>R5 is also applicable. Moreover, this exemplary embodiment may be combined with the fifth exemplary embodiment. Alternatively speaking, in an exemplary embodiment (not shown), the pixel electrodes of the sub-pixels in the pixel structure may have the following relationships: R6>R4≥R5 and R1>R3≥R2, for example. In this exemplary embodiment, the first pixel electrode PE-1 further includes the first pixel electrode PE-1M in a first major region MA-1, the second pixel electrode PE-2 further includes the second pixel electrode PE-2M in a second major region MA-2, and the third pixel electrode PE-3 further includes the third pixel electrode PE-3M in a third major region MA-3.

In this exemplary embodiment, the first sub-pixel Pa is, for example, a blue sub-pixel, the second sub-pixel Pb is, for example, a red sub-pixel, and the third sub-pixel Pc is, for example, a green sub-pixel. In this exemplary embodiment, the minor spacing S2-2, S4-2, S6-2 of the first, second and third pixel electrodes PE-1S, PE-2S, PE-3S of the first, second and third minor regions SA-1, SA-2, SA-3, and the spacing S1, S3, S5 of the first, second and third pixel electrodes PE-1M, PE-2M, PE-3M of the first, second and third major regions MA-1, MA-2, MA-3 are, for example, the same. The main spacing S2-1, S4-1, S6-1 of the first, second and third pixel electrodes PE-1S, PE-2S, PE-3S at the first, second and third minor regions SA-1, SA-2, SA-3 are, for example, the same. The line-widths L1 to L6 of the first, second and third pixel electrodes PE-1M, PE-2M, PE-3M, PE-1S, PE-2S, PE-3S are, for example, the same. Alternatively speaking, according to the exemplary embodiments, only the main spacing S2-1, S4-1, S6-1 of the first, second and third pixel electrodes PE-1S, PE-2S, PE-3S at the first, second and third minor regions SA-1, SA-2, SA-3 are being adjusted.

In the exemplary embodiment, by adjusting the ratios of the pixel electrodes with the different spacing occupied in the minor region and the relationships between the above ratios, the color shift problems in a side view image, such as bluish at low gray level, greenish or reddish at mid gray level, and greenish at high gray level, are mitigated.

Seventh Exemplary Embodiment

Figure 11:
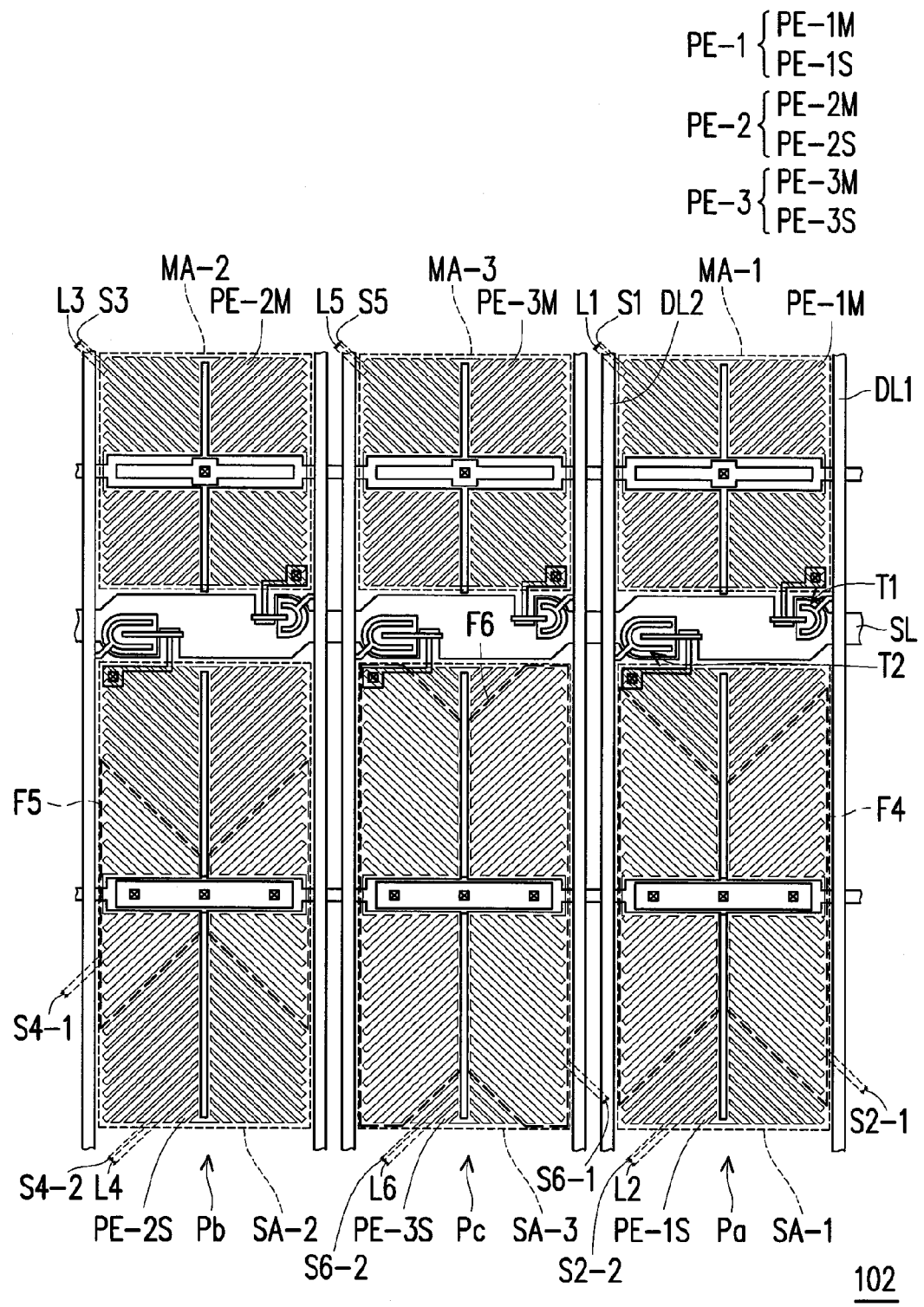
FIG. 11 is a schematic diagram of a pixel structure according to the seventh exemplary embodiment of the invention.

FIG. 11 is a schematic diagram of a pixel structure according to the seventh exemplary embodiment of the invention. The structural components of the pixel structure of this exemplary embodiment are substantially similar to those disclosed in the sixth exemplary embodiment. The following disclosure is directed to the spacing relationship of the pixel electrodes. Referring to FIG. 11, in this exemplary embodiment, the second main spacing S2-1 is greater than the second minor spacing S2-2, the fourth main spacing S4-1 is greater than the fourth minor spacing S4-2, and the sixth spacing S6-1 is greater than or equal to the sixth minor spacing S6-2 (FIG. 11 illustrates the sixth main spacing S6-1 being greater than the sixth minor spacing S6-2 as an example). In this exemplary embodiment, each of the minor regions SA-1, SA-2, SA-3 can be also referred to as the A region, and each of the main regions MA-1, MA-2, MA-3 can be also referred to as the B region. The sixth ratio R6 is greater than the fourth ratio R4, and the fourth ratio R4 is greater than or equal to the fifth ratio R5, which is R6>R4≥R5. The sixth ratio R6 is less than or equal to 1, and the sixth ratio R6 is equal to 1 means the sixth main spacing S6-1 and the sixth minor spacing S6-2 of the third pixel electrode PE-3S disposed in the third minor region SA-3 are identical, which is S6-1=S6-2. The fourth ratio R4 and the fifth ratio are greater than 0 and less than 1. In this exemplary embodiment, R6>R4>R5 is used as an example. In another exemplary embodiment (not shown), the pixel electrodes of the sub-pixels in the pixel structure may have the following relationship R6>R4=R5. Moreover, this exemplary embodiment may be combined with the fifth exemplary embodiment. Alternatively speaking, in yet another exemplary embodiment, the pixel electrodes of the sub-pixels in the pixel structure may have the following relationships: R6>R4≥R5 and R1>R3≥R2, for example. In this exemplary embodiment, using the sixth main spacing S6-1 being greater than the sixth minor spacing S6-2 as an example; however, in another exemplary embodiment (not shown), the sixth main spacing S6-1 can be equal to the sixth minor spacing S6-2.

In this exemplary embodiment, the first sub-pixel Pa is, for example, a blue sub-pixel, the second sub-pixel Pb is, for example, a red sub-pixel, and the third sub-pixel Pc is, for example, a green sub-pixel.

In the exemplary embodiment, by adjusting the ratios of the pixel electrodes with the different spacing and the relationships between the above ratios, the color shift problem in a side view image, such as bluish at low gray level, greenish or reddish at mid gray level, and greenish at high gray level, are mitigated. Hence, the display quality of the display panel is enhanced.

The following experimental examples confirm at least some of the merits of the above exemplary embodiments. In one experimental example, the ratios of the pixel electrodes having different spacing in the main region or the ratios of the pixel electrodes having different spacing in the minor region are designed to follow the relationships: R1>R3=R2 and R4=R6>R5. More specifically, in the first sub-pixel Pa (blue sub-pixel), the ratios of the line-width L1 to the spacing S1-1, S1-2, S2-1, S2-2 of the first pixel electrode PE-1S in the first main region MA-1 and the first minor region SA-1 are all 5/4. Hence, the first ratio R1 of the first pixel electrode PE-1M having the first main spacing S1-1 to the first pixel electrodes PE-1M in the first main region is 1; the fourth ratio R4 of the first pixel electrodes PE-1S having the second main spacing S2-1 to the first pixel electrodes PE-1S in the first minor region SA-1 is 1.

In the second sub-pixel Pb (red sub-pixel), the ratio of the line-width L3 to the third main spacing S3-1 of the second pixel electrode PE-2M in the second main region MA-2 is 5/4; the ratio of the line-width L3 to the third minor spacing S3-2 of the second pixel electrode PE-2M is 5/2, wherein the second ratio R2 is 1/4. The ratio of the line-width L4 to the fourth main spacing S4-1 of the second pixel electrode PE-2S in the second minor region SA-2 is 5/4, while the ratio of the line width L4 to the fourth minor spacing S4-2 of the second pixel electrode PE-2S is 5/2, wherein the fifth ratio R5 is 1/2. In the third sub-pixel (green sub-pixel), the ratio of the line-width L5 to the fifth main spacing S5-1 of the third pixel electrode PE-3M in the third main region MA-3 is 5/4, while the line-width L5 to the fifth minor spacing S5-2 of the third pixel electrode PE-3M is 5/2, wherein the third ratio R3 is 1/2. The ratios of the line-width L6 to the spacing S6-1, S6-2 of the third pixel electrode PE-3S in the third minor region SA-3 are 5/4, wherein the sixth ratio R6 is 1.

Figure 12A:
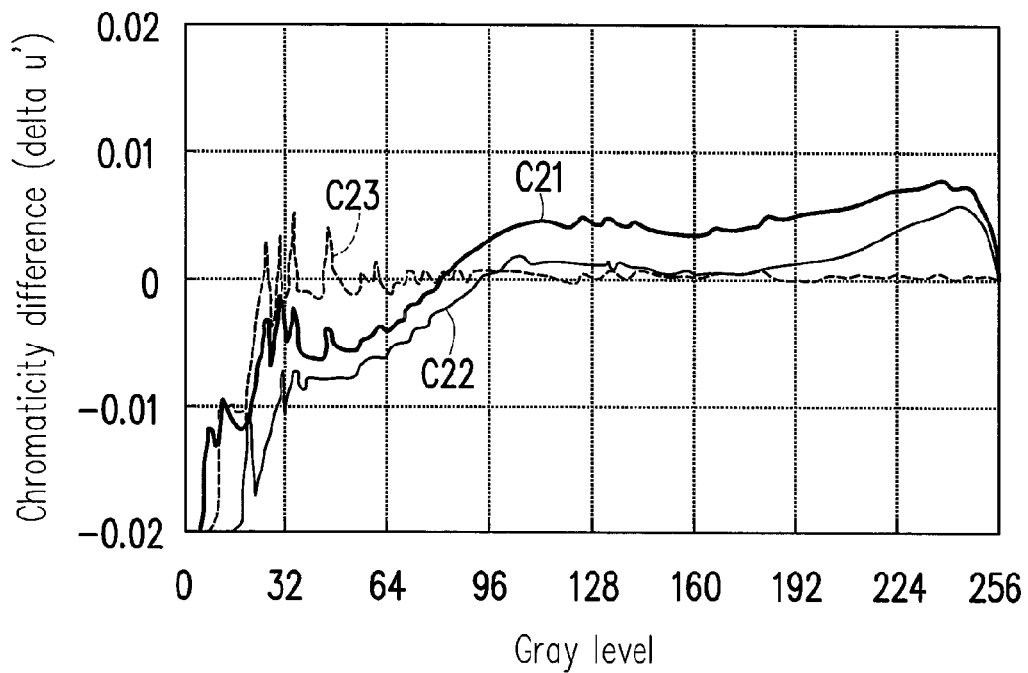
FIG. 12A is a graph showing the relationship between the gray level and chromaticity difference (delta u') of the liquid crystal display panel of an experimental example of the invention.
Figure 12B:
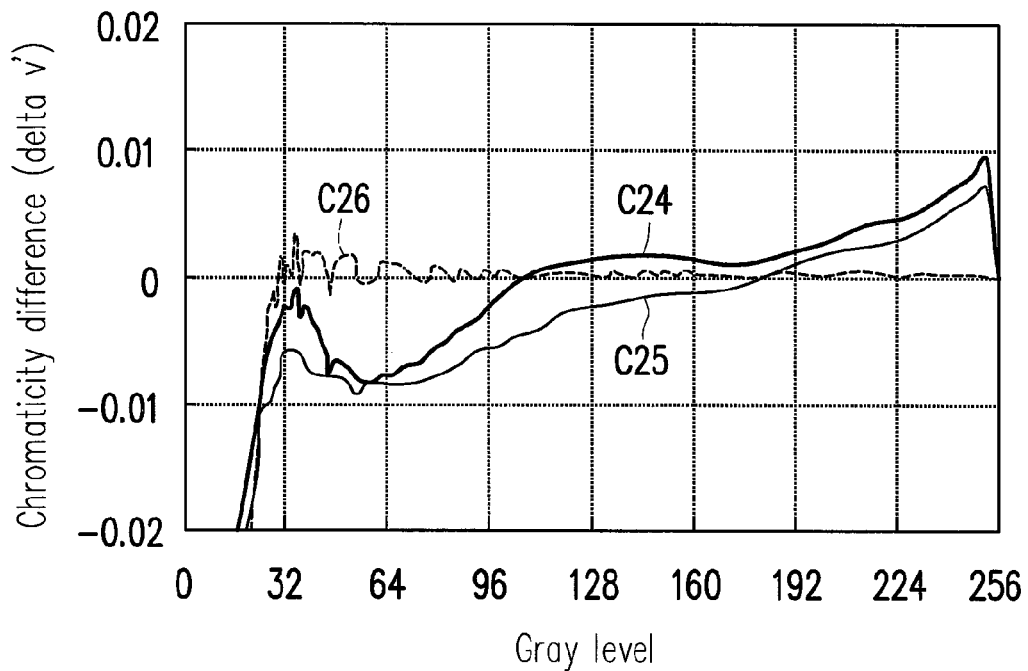
FIG. 12B is a graph showing the relationship between the gray level and chromaticity difference (delta v') of the liquid crystal display panel of an experimental example of the invention.

When the pixel electrodes in the first sub-pixel Pa, the second sub-pixel Pb and the third sub-pixel Pc including the different spacing have the above disclosed ratios at the major and minor regions, the relationships of gray-level and chromaticity difference of the liquid crystal display panel are as shown in FIGS. 12A and 12B.

As shown in FIGS. 12A and 12B, the curves C21, C24 denotes a gray-level and chromaticity difference relationship obtained from viewing the LCD having the conventional pixel structure (in which the line-width/spacing ratios of all pixel electrode are 5/3) at a 45° viewing angle; the curves C22, C25 denote a gray-level and chromaticity difference relationship obtained from viewing the LCD having the pixel structure of the experimental example of the invention at a 45° viewing angle; the curves C23, C26 denotes a gray-level and chromaticity difference relationship obtained from viewing the LCD at the view angle of 0°.

According to FIGS. 12A and 12B, when the ratios of the pixel electrodes of the experimental examples having different spacing in the main region or the ratios of the pixel electrodes having different spacing in the minor region have the following relationships: R1>R3=R2 and R4=R6>R5, the color shift problem of a side view image can certainly be mitigated, comparing with the conventional pixel structure design.

It is worthy to note that, although the above exemplary embodiments respectively disclose adjusting the spacing of the pixel electrodes in the sub-pixel at the main region and the minor region, the ratios of the pixel electrodes having different spacing in the main region or the ratios of the pixel electrodes having different spacing in the minor region, the various type of adjustments in the various exemplary embodiments can be combined to further lower the color shift problem of the side view image of the different color pixels.

According to the exemplary embodiments of the invention, by adjusting the spacing of the pixel electrodes in the sub-pixel at the main region and the minor region, the ratios of the pixel electrodes having different spacing in the main region or the ratios of the pixel electrodes having different spacing in the minor region, or by combining these various adjustment approaches, the color shift problem of the side view image of the different color pixels can be mitigated. Hence, the display quality of a display panel is enhanced. More particularly, the invention is achieved by the designing of the spacing of the pixel electrodes of the sub-pixels, it is easily integrated with the existing process, and a substantial increase of the manufacturing cost is thereby obviated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, comprising:
   a first substrate;
   a pixel structure, disposed on the first substrate, the pixel structure comprising:
      a scan line extended along a first direction;
      data lines extended along a second direction and intersected with the scan line, so as to define a first main region, a first minor region, a second main region, and a second minor region, wherein the first main region and the first minor region is aligned in the second direction, the second main region and the second minor region is aligned in the second direction, one scan line is simultaneously disposed between the first main region and the first minor region and between the second main region and the second minor region, the first main region and the second main region is aligned in the first direction, the first minor region and the second minor region is aligned in the first direction, and one data line is simultaneously disposed between the first main region and the second main region and between the first minor region and the second minor region;
      a first sub-pixel comprising a first pixel electrode, wherein the spacing of the first pixel electrode in the first main region is the same and is equal to a first spacing, and the spacing of the first pixel electrode in the first minor region is the same and is equal to a second spacing, and wherein the first spacing is greater than the second spacing; and
      a second sub-pixel comprising a second pixel electrode, wherein the spacing of the second pixel electrode in the second main region is the same and is equal to a third spacing, and the spacing of the second pixel electrode in the second minor region is the same and is equal to a fourth spacing, wherein the third spacing is smaller than or equal to the fourth spacing, and wherein the first spacing is greater than the third spacing;
   a second substrate, disposed opposite to the first substrate; and
   a display medium layer, disposed between the first substrate and the second substrate.

2. The display panel of claim 1, wherein the third spacing is smaller than the fourth spacing.

3. The display panel of claim 1, wherein the first sub-pixel comprises a blue sub-pixel, and the second sub-pixel comprises a red sub-pixel.

4. The display panel of claim 1, wherein the second spacing is greater than the fourth spacing.

5. The display panel of claim 1, wherein the pixel structure further comprises a third sub-pixel comprising a third pixel electrode, wherein the third pixel electrode has a fifth spacing in a third main region and has a sixth spacing in a third minor region, and wherein the fifth spacing is different from the sixth spacing.

6. The display panel of claim 5, wherein the third sub-pixel comprises a green sub-pixel.

7. The display panel of claim 5, wherein the first spacing is greater than the fifth spacing, and wherein the fifth spacing is greater than or equal to the third spacing.

8. The display panel of claim 5, wherein the second spacing is greater than or equal to the sixth spacing, and wherein the sixth spacing is greater than the fourth spacing.

9. The display panel of claim 5, wherein the sixth spacing is greater than the second spacing, and wherein the second spacing is greater than or equal to the fourth spacing.

10. A display panel, comprising:
    a first substrate;
    a pixel structure, disposed on the first substrate, the pixel structure comprising:
       a first sub-pixel comprising a first pixel electrode, wherein the spacing of the first pixel electrode in an A region is the same and is equal to a first spacing, and the spacing of the first pixel electrode in a B region is the same and is equal to a second spacing, wherein the A region and the B region of the first sub-pixel are separated by a scan line;
       a second sub-pixel comprising a second pixel electrode, wherein the spacing of the second pixel electrode in an A region is the same and is equal to a third spacing, and the spacing of the second pixel electrode in a B region is the same and is equal to a fourth spacing, wherein the A region and the B region of the first sub-pixel are separated by the scan line; and
       a third sub-pixel comprising a third pixel electrode, wherein the spacing of the third pixel electrode in an A region is the same and is equal to a fifth spacing, and the spacing of the third pixel electrode in a B region is the same and is equal to a sixth spacing, wherein the A region and the B region of the first sub-pixel are separated by the scan line, wherein the first spacing is greater than the fifth spacing, and wherein the fifth spacing is greater than or equal to the third spacing;
    a second substrate, disposed opposite to the first substrate; and
    a display medium layer, disposed between the first substrate and the second substrate.

11. The display panel of claim 10, wherein the second spacing is greater than or equal to the sixth spacing, and wherein the sixth spacing is greater than the fourth spacing.

12. The display panel of claim 10, wherein the sixth spacing is greater than the second spacing, and wherein the second spacing is greater than or equal to the fourth spacing.

13. The display panel of claim 10, wherein the first sub-pixel comprises a blue sub-pixel, the second sub-pixel comprises a red sub-pixel, and the third sub-pixel comprises a green sub-pixel.

14. The display panel of claim 10, wherein the first sub-pixel comprises a green sub-pixel, the second sub-pixel comprises a red sub-pixel, and the third sub-pixel comprises a blue sub-pixel.

15. A display panel, comprising:
    a first substrate;
    a pixel structure, disposed on the first substrate, the pixel structure comprising:
       a first sub-pixel comprising a first pixel electrode, wherein the spacing of the first pixel electrode in an A region is the same and is equal to a first spacing, and the spacing of the first pixel electrode in a B region is the same and is equal to a second spacing, wherein the A region and the B region of the first sub-pixel are separated by a scan line;
       a second sub-pixel comprising a second pixel electrode, wherein the spacing of the second pixel electrode in an A region is the same and is equal to a third spacing, and the spacing of the second pixel electrode in a B region is the same and is equal to a fourth spacing, wherein the A region and the B region of the first sub-pixel are separated by the scan line; and a third sub-pixel comprising a third pixel electrode, wherein the spacing of the third pixel electrode in an A region is the same and is equal to a fifth spacing, and the spacing of the third pixel electrode in a B region is the same and is equal to a sixth spacing, wherein the A region and the B region of the first sub-pixel are separated by the scan line, wherein the second spacing is equal to the sixth spacing, and wherein the sixth spacing is greater than the fourth spacing;

a second substrate, disposed opposite to the first substrate; and a display medium layer, disposed between the first substrate and the second substrate.

16. The display panel of claim 15, wherein the first sub-pixel comprises a blue sub-pixel, the second sub-pixel comprises a red sub-pixel, and the third sub-pixel comprises a green sub-pixel.

17. A display panel, comprising:
a first substrate;
a pixel structure, disposed on the first substrate, the pixel structure comprising:
a first sub-pixel comprising a first pixel electrode, wherein the first pixel electrode in an A region of the first sub-pixel includes a part of the first pixel electrode having a first main spacing and the other part of the first pixel electrode having a first minor spacing, the first main spacing is greater than the first minor spacing, and a first area ratio is defined as an area of the part of the first pixel electrode having the first main spacing to that of all of the first pixel electrode in the A region of the first sub-pixel;
a second sub-pixel comprising a second pixel electrode, wherein the second pixel electrode in an A region of the second sub-pixel includes a part of the second pixel electrode having a third main spacing and the other part of the second pixel electrode having a third minor spacing, the third main spacing is greater than the third minor spacing, and a second area ratio is defined as an area of the part of the second pixel electrode having the third main spacing to that of all of the second pixel electrode in the A region of the second sub-pixel; and
a third sub-pixel comprising a third pixel electrode, wherein the third pixel electrode in an A region of the third sub-pixel includes a part of the third pixel electrode having a fifth main spacing and the other part of the third pixel electrode having a fifth minor spacing, the fifth main spacing is greater than the fifth minor spacing, and a third area ratio is defined as an area of the part of third pixel electrode having the fifth main spacing to that of all of the third pixel electrode in the A region of the third sub-pixel, wherein the first area ratio is greater than the third area ratio, and the third area ratio is greater than or equal to the second area ratio, wherein the A region of the first sub-pixel, the A region of the second sub-pixel and the A region of the third sub-pixel are aligned, and the A region of the third sub-pixel is disposed between the A region of the first sub-pixel and the A region of the second sub-pixel;
a second substrate, disposed opposite to the first substrate; and
a display medium layer, disposed between the first substrate and the second substrate.

18. The display panel of claim 17, wherein the first pixel electrode in a B region of the first sub-pixel includes a part of the first pixel electrode having a second main spacing and the other part of the first pixel electrode having a second minor spacing, the second main spacing is greater than the second minor spacing, a fourth area ratio is defined as an area of the part of the first pixel electrode having the second main spacing to that of all of the first pixel electrode in the B region of the first sub-pixel, the second pixel electrode in a B region of the second sub-pixel of the second sub-pixel includes a part of the second pixel electrode having a fourth main spacing and the other part of the second pixel electrode having a fourth minor spacing, the fourth main spacing is greater than the fourth minor spacing, a fifth area ratio is defined as an area of the part of the second pixel electrode having the fourth main spacing to that of all of the second pixel electrode in the B region of the second sub-pixel, the third pixel electrode in a B region of the third sub-pixel includes a part of the third pixel electrode having a sixth major spacing and the other part of the third pixel electrode having a sixth minor spacing, the sixth major spacing is greater than the sixth minor spacing, and a sixth area ratio is defined as an area of the part of the third pixel electrodes having the sixth main spacing to that of all of the third pixel electrode in the B region of the third sub-pixel, wherein the fourth area ratio is greater than or equal to the sixth area ratio and the sixth area ratio is greater than the fifth area ratio, or the sixth area ratio is greater than the fourth area ratio and the fourth area ratio is greater than or equal to the fifth area ratio, wherein the B region of the first sub-pixel, the B region of the second sub-pixel and the B region of the third sub-pixel are aligned, and the B region of the third sub-pixel is disposed between the B region of the first sub-pixel and the B region of the second sub-pixel.

19. The display panel of claim 17, wherein the first sub-pixel comprises a blue sub-pixel, the second sub-pixel comprises a red sub-pixel, and the third sub-pixel comprises a green sub-pixel.

20. The display panel of claim 17, wherein the first sub-pixel comprises a green sub-pixel, the second sub-pixel comprises a red sub-pixel, and the third sub-pixel comprises a blue sub-pixel.

21. A display panel, comprising:
a first substrate;
a pixel structure, disposed on the first substrate, the pixel structure comprising:
a first sub-pixel comprising a first pixel electrode, wherein the first pixel electrode in a B region of the first sub-pixel includes a part of the first pixel electrode having a second main spacing and the other part of the first pixel electrode having a second minor spacing, the second main spacing is greater than the second minor spacing, and a fourth area ratio is defined as an area of the part of the first pixel electrode having the second main spacing to that of all of the first pixel electrode in the B region of the first sub-pixel;
a second sub-pixel comprising a second pixel electrode, wherein the second pixel electrode in a B region of the second sub-pixel includes a part of the second pixel electrode having a fourth main spacing and the other part of the second pixel electrode having a fourth minor spacing, the fourth main spacing is greater than the fourth minor spacing, and a fifth area ratio is defined as an area of the part of the second pixel electrode having the fourth main spacing to that of all of the second pixel electrode in the B region of the second sub-pixel; and
a third sub-pixel comprising a third pixel electrode, wherein the third pixel electrode in a B region of the third sub-pixel includes a part of the third pixel electrode having a sixth main spacing and the other part of the third pixel electrode having a sixth minor spacing, the sixth main spacing is greater than the sixth minor spacing, and a sixth area ratio is defined as an area of the part of third pixel electrodes having the sixth main spacing to that of all of the third pixel electrode in the B region of the third sub-pixel, wherein the fourth area ratio is equal to the sixth area ratio, and the sixth area ratio is greater than the fifth area ratio, wherein the B region of the first sub-pixel, the B region of the second sub-pixel and the B region of the third sub-pixel are aligned, and the B region of the third sub-pixel is disposed between the B region of the first sub-pixel and the B region of the second sub-pixel;

a second substrate, disposed opposite to the first substrate; and a display medium layer, disposed between the first substrate and the second substrate.

22. The display panel of claim 21, wherein the first sub-pixel comprises a blue sub-pixel, the second sub-pixel comprises a red sub-pixel, and the third sub-pixel comprises a green sub-pixel.

23. A display panel, comprising:

a first substrate;

a pixel structure, disposed on the first substrate, the pixel structure comprising:

a first sub-pixel comprising a first pixel electrode, wherein the first pixel electrode in an A region of the first sub-pixel includes a part of the first pixel electrode having a first main spacing and the other part of the first pixel electrode having a first minor spacing, the first main spacing is greater than the first minor spacing, and a first area ratio is defined as an area of the part of the first pixel electrode having the first main spacing to that of all of the first pixel electrode in the A region of the first sub-pixel;

a second sub-pixel comprising a second pixel electrode, wherein the second pixel electrode in an A region of the second sub-pixel includes a part of the second pixel electrode having a third main spacing and the other part of the second pixel electrode having a third minor spacing, the third main spacing is greater than the third minor spacing, and a second area ratio is defined as an area of the part of the second pixel electrode having the third main spacing to that of all of the second pixel electrode in the A region of the second sub-pixel; and a third sub-pixel comprising a third pixel electrode, wherein the third pixel electrode in an A region of the third sub-pixel includes a part of the third pixel electrode having a fifth main spacing and the other part of the third pixel electrode having a fifth minor spacing, the fifth main spacing is greater than the fifth minor spacing, and a third area ratio is defined as an area of the part of third pixel electrode having the fifth main spacing to that of all of the third pixel electrode in the A region of the third sub-pixel, wherein the first area ratio is greater than the third area ratio, and the third area ratio is equal to the second area ratio, wherein the A region of the first sub-pixel, the A region of the second sub-pixel and the A region of the third sub-pixel are aligned, and the A region of the third sub-pixel is disposed between the A region of the first sub-pixel and the A region of the second sub-pixel;

a second substrate, disposed opposite to the first substrate; and a display medium layer, disposed between the first substrate and the second substrate.

* * * * *